US010511775B2

(12) United States Patent
Imanishi

(10) Patent No.: US 10,511,775 B2
(45) Date of Patent: Dec. 17, 2019

(54) SHAKE DETECTION DEVICE AND SHAKE CORRECTION DEVICE OF IMAGING DEVICE, IMAGING DEVICE, AND SHAKE DETECTION METHOD

(71) Applicant: FUJIFILM Corporation, Tokyo (JP)

(72) Inventor: Kazutaka Imanishi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/351,519

(22) Filed: Mar. 13, 2019

(65) Prior Publication Data

US 2019/0260936 A1 Aug. 22, 2019

Related U.S. Application Data

(63) Continuation of application No. PCT/JP2017/029777, filed on Aug. 21, 2017.

(30) Foreign Application Priority Data

Sep. 15, 2016 (JP) .................... 2016-180811

(51) Int. Cl.
*H04N 5/232* (2006.01)
*H04N 5/225* (2006.01)

(52) U.S. Cl.
CPC ....... *H04N 5/23267* (2013.01); *H04N 5/2254* (2013.01); *H04N 5/23229* (2013.01)

(58) Field of Classification Search
CPC .......... H04N 5/23267; H04N 5/23229; H04N 5/2254
See application file for complete search history.

(56) References Cited

U.S. PATENT DOCUMENTS 9,071,757 B2 * 6/2015 Imada ................ H04N 5/23254
2002/0146245 A1 * 10/2002 Masuda .................... G03B 5/00
396/50

(Continued)

FOREIGN PATENT DOCUMENTS

JP 2002359768 12/2002
JP 2011164227 8/2011

(Continued)

OTHER PUBLICATIONS

"International Search Report (Form PCT/ISA/210) of PCT/JP2017/029777," dated Oct. 31, 2017, with English translation thereof, pp. 1-5.

(Continued)

*Primary Examiner* — Timothy J Henn
(74) *Attorney, Agent, or Firm* — JCIPRNET

(57) ABSTRACT

There are provided a shake detection device of an imaging device, a shake correction device, an imaging device, and a shake detection method which are capable of performing high-accurate shake detection and shake correction. A shake detection device subtracts a reference value from a sensor output of a gyro sensor, and extracts a low frequency component and a high frequency component from a sensor output after the reference value subtraction by using an LPF and a BPF. A first determination unit determines whether or not the imaging device is in a fixed-point imaging state based on the LPF output and the BPF output. In a case where it is determined that the imaging device is in the fixed-point imaging state, a reference value shift amount calculation unit calculates a shift amount (reference value shift amount) for the reference value based on the LPF output for a period during which the determination is performed. A subtraction unit corrects the reference value by subtracting the reference value shift amount from the sensor output after the reference value subtraction. An HPF removes a low frequency noise from the sensor output after the correction of the reference value shift amount. High-accurate shake is detected.

15 Claims, 20 Drawing Sheets

(56) References Cited

U.S. PATENT DOCUMENTS

| | | | |
|---|---|---|---|
| 2009/0067826 A1* | 3/2009 | Shinohara | G03B 17/18 396/50 |
| 2010/0134639 A1* | 6/2010 | Takeuchi | G02B 27/646 348/208.4 |
| 2011/0194847 A1 | 8/2011 | Nobushige | |
| 2013/0195434 A1 | 8/2013 | Sakurai et al. | |
| 2014/0037279 A1 | 2/2014 | Wakamatsu | |
| 2015/0103194 A1* | 4/2015 | Takeuchi | H04N 5/23287 348/208.6 |
| 2015/0172546 A1* | 6/2015 | Takeuchi | G02B 7/023 348/208.6 |
| 2015/0256753 A1* | 9/2015 | Shibata | G06T 5/002 348/208.3 |

FOREIGN PATENT DOCUMENTS

| | | |
|---|---|---|
| JP | 2012018328 | 1/2012 |
| JP | 2013178503 | 9/2013 |
| JP | 2014232237 | 12/2014 |
| JP | 2015114534 | 6/2015 |
| JP | 2015180917 | 10/2015 |

OTHER PUBLICATIONS

"Written Opinion of the International Searching Authority (Form PCT/ISA/237) of PCT/JP2017/029777," dated Oct. 31, 2017, with English translation thereof, pp. 1-7.

* cited by examiner

RESPONSE AT THE TIME OF PANNING

SHAKE DETECTION DEVICE AND SHAKE CORRECTION DEVICE OF IMAGING DEVICE, IMAGING DEVICE, AND SHAKE DETECTION METHOD

CROSS-REFERENCE TO RELATED APPLICATIONS

The present application is a Continuation of PCT International Application No. PCT/JP2017/029777 filed on Aug. 21, 2017 claiming priority under 35 U.S.C. § 119(a) to Japanese Patent Application No. 2016-180811 filed on Sep. 15, 2016. Each of the above applications is hereby expressly incorporated by reference, in their entirety, into the present application.

BACKGROUND OF THE INVENTION

1. Field of the Invention

The present invention relates to a shake detection device and a shake correction device of an imaging device, an imaging device, and a shake detection method, and particularly, to a technology capable of performing high-accurate shake detection and shake correction.

2. Description of the Related Art

In the related art, a gyro sensor is used for detecting shake (angular velocity) of a camera required for correcting the shake of the camera. Since a reference value (an output at the time of stationary) as an output of the gyro sensor is drifted, a low frequency component including a drift and noise is removed from the output of the gyro sensor by using a high-pass filter, and thus, the influence of the output of the gyro sensor on an integral value is reduced.

Incidentally, the reference value of the gyro sensor is changed due to a change in ambient temperature, but it is necessary to intensively apply the high-pass filter (reduce a cutoff frequency) in order to remove the changed reference value. In this case, since a low frequency output of the gyro sensor is also removed, there is a problem that it is not possible to cope with slow shutter and an effect of the shake correction is decreased.

In contrast, a technology of detecting a reference value from a sensor output (angular velocity output) of the gyro sensor during an operation of the camera and updating the reference value is suggested (JP2013-178503A).

A shake correction device described in JP2013-178503A comprises a direct current component detection unit which detects a direct current component from a sensor output of a gyro sensor and outputs the detected direct current component and a panning detection unit which detects panning of a camera based on the sensor output of the gyro sensor, and updates a reference value of the sensor output by using a value of the direct current component output from the direct current component detection unit in a case where the panning detection unit does not detect the panning.

JP2002-359768A describes a determination method of determining panning or tilting of a camera from a sensor output of an angular velocity sensor. For example, in this determination method, it is determined that an imaging device pans or tilts in a case where an angular velocity output obtained by the angular velocity sensor is equal to or greater than a threshold value continued for a predetermined time by using the fact that a state in which a sign of the sensor output (angular velocity output) of the angular velocity sensor indicates the same direction and is equal to or greater than a predetermined level tends to be continued at the time of panning or tilting. In a case where it is determined that the imaging device pans or tilts, an image movement correction device described in JP2002-359768A changes the cutoff frequency of the high-pass filter, and restricts a correction function at the time of panning or tilting.

SUMMARY OF THE INVENTION

For example, since the panning detection unit described in JP2013-178503A detects panning based on a change amount of the direct current component of the sensor output of the gyro sensor with time, it is possible to detect panning in which the angular velocity is gradually increased, but it is not possible to detect typical panning in which the angular velocity is constant. Since the direct current component of the sensor output before the reference value is subtracted is used for detecting panning, it is not possible to determine whether the sensor output is drifted or a panning operation at a very low speed is performed. Accordingly, since the reference value of the gyro sensor is erroneously detected, there is a problem that shake detection accuracy (shake correction accuracy) deteriorates.

In the panning determination method described in JP2002-359768A, since a direct current drift component of an unnecessary band component included in the sensor output is removed from the sensor output of the angular velocity sensor by using the high-pass filter and the panning is determined based on the sensor output after the direct current drift component is removed, it is not possible to determine the panning at the very low speed corresponding to the drift. The invention described in JP2002-359768A does not relate to a method of detecting the angular velocity by removing the drift component included in the sensor output of the angular velocity sensor by using the high-pass filter and subtracting the reference value (the output at the time of stationary) from the sensor output.

The present invention has been made in view of such circumstances, and an object of the present invention is to provide a shake detection device and a shake correction device of an imaging device, an imaging device, and a shake detection method which are capable of accurately calculating a shift amount of a reference value of a shake detection sensor even in a case where the imaging device is in a hand-held state and consequently performing high-accurate shake detection and shake correction.

In order to achieve the object, a shake detection device of an imaging device according to an aspect of the present invention comprises a shake detection sensor that detects shake occurring in the imaging device, a storage unit that stores a reference value corresponding to an output of the shake detection sensor in a case where the imaging device is in a stationary state, a subtraction unit that subtracts the reference value from the output of the shake detection sensor, a first filter that extracts a low frequency component from an output after the subtraction of the reference value using the subtraction unit, a second filter that extracts a high frequency component from the output after the subtraction of the reference value using the subtraction unit, a first determination unit that determines whether or not the imaging device is in a hand-held state and a fixed-point imaging state based on an output of the first filter and an output of the second filter, a reference value shift amount calculation unit that calculates a reference value shift amount for the reference value based on the output of the first filter for a period during which the determination is performed in a case where the first determination unit determines that the imaging device is in the hand-held state and the fixed-point imaging state, a correction unit that corrects the output after the subtraction of the reference value using the subtraction unit by using the reference value shift amount, and a third filter that removes a low frequency noise from an output after the correction of the reference value shift amount.

According to an aspect of the present invention, the low frequency component and the high frequency component are extracted from the output after the reference value subtraction which is obtained by subtracting the reference value corresponding to the output of the shake detection sensor in a case where the imaging device is in the stationary state from the output of the shake detection sensor by the first filter and the second filter. It is determined whether or not the imaging device is in the hand-held state and the fixed-point imaging state based on the output of the low frequency component extracted by the first filter and the output of the high frequency component extracted by the second filter. Accordingly, it is possible to determine whether or not the imaging device is in the hand-held state and the fixed-point imaging state even though the reference value is changed by the drift distinguishably from a palming operation at a very low speed. In a case where it is determined that the imaging device is in the hand-held state and the fixed-point imaging state, since the shift amount (reference value shift amount) for the reference value is calculated based on the output of the first filter for the period during which the determination is performed, it is possible to accurately calculate the reference value shift amount of the shake detection sensor, and the output after the reference value subtraction is corrected by using the calculated reference value shift amount. The low frequency noise is removed from the output after the correction of the reference value shift amount by the third filter, and the high-accurate shake detection is performed.

In the shake detection device of an imaging device according to another aspect of the present invention, in a case where the output of the first filter is within a first output width for a specified time, the number of times a sign of the output of the second filter is changed for the specified time is equal to or greater than a threshold value, and the output of the second filter is within a second output width for the specified time, it is preferable that the first determination unit determines that the imaging device is in the hand-held state and the fixed-point imaging state. In this aspect, it is preferable that the specified time is about one second to several seconds. It is preferable that the first output width is determined based on the shift amount with which the reference value may be changed by the drift. In a case where the imaging device is in the hand-held state (in the case of hand-held imaging), since the frequency of the shake is about 10 Hz and the angular velocity of the shake is about ±0.017 to 0.052 (rad/s), it is preferable that the threshold value and the second output width are determined based on these values.

In the case of the panning operation at the very low speed, the number of times the sign of the output of the second filter is changed is equal to or greater than the threshold value for the specified time and the output of the second filter is within the second output width for the specified time. However, the condition in which the output of the first filter is within the first output width for the specified time is satisfied, and it is possible to determine that the imaging device is in the panning state at the very low speed and is in the hand-held state and the fixed-point imaging state.

In the shake detection device of an imaging device according to still another aspect of the present invention, it is preferable that the correction unit subtracts the reference value shift amount from the output after the subtraction of the reference value using the subtraction unit. Accordingly, it is possible to individually use the reference value and the reference value shift amount.

It is preferable that the shake detection device of an imaging device according to still another aspect of the present invention further comprises a second determination unit that determines whether or not the reference value shift amount calculated by the reference value shift amount calculation unit is within a predetermined range. It is preferable that in a case where the second determination unit determines that the reference value shift amount is within the predetermined range, the correction unit corrects the output after the subtraction of the reference value using the subtraction unit by using the reference value shift amount. The reference value shift amount including the noise other than the drift is calculated, and the calculated reference value shift amount (incorrect reference value shift amount) is not used in the correction in a case where the calculated reference value shift amount exceeds the predetermined range.

It is preferable that the shake detection device of an imaging device according to still another aspect of the present invention further comprises a temperature sensor that detects a temperature of the shake detection sensor and a setting unit that sets the predetermined range according to the temperature detected by the temperature sensor. The reference value shift amount is generated by the drift of the output of the shake detection sensor, but the magnitude of the drift is influenced by the temperature of the shake detection sensor. Accordingly, it is possible to appropriately determine whether or not the calculated reference value shift amount is caused by only the drift by detecting the temperature of the shake detection sensor and setting the predetermined range (the range in which the reference value shift amount may be changed by the drift) according to the detected temperature.

It is preferable that the shake detection device of an imaging device according to still another aspect of the present invention further comprises a first filter characteristic setting unit that sets a cutoff frequency of the third filter for removing the low frequency noise to be a frequency lower than a frequency before the correction of the output in a case where the output after the subtraction of the reference value is corrected by using the reference value shift amount calculated in a case where it is determined that the imaging device is in the hand-held state and the fixed-point imaging state. Since it is possible to appropriately remove the drift component by correcting the output after the reference value subtraction by using the reference value shift amount, the cutoff frequency of the third filter is set to be the frequency lower than the frequency before the reference value shift amount is reflected, and the effective low frequency component is not removed.

It is preferable that the shake detection device of an imaging device according to still another aspect of the present invention further comprises a third determination unit that determines whether or not the imaging device is in the stationary state. It is preferable that in a case where the third determination unit determines that the imaging device is in the stationary state, the reference value shift amount calculation unit calculates the reference value shift amount for the reference value based on the output of the first filter for a period during which it is determined that the imaging device is in the stationary state in preference to the determination result using the first determination unit. For example, in a case where the imaging device is not in the hand-held state like a case where the imaging device is attached to the tripod, the output of the shake detection sensor is the output in a case where the imaging device is in the stationary state. Accordingly, since the output after the reference value subtraction corresponds to the drift of the output of the shake detection sensor, the reference value shift amount calculated in this case has reliability higher than reliability of the reference value shift amount calculated in a case where the first determination unit determines that the imaging device is in the hand-held state and the fixed-point imaging state. Thus, in a case where the third determination unit determines that the imaging device is in the stationary state, the reference value shift amount for the reference value is calculated based on the output of the first filter for the period during which it is determined that the imaging device is in the stationary state in preference to the determination result using the first determination unit.

In the shake detection device of an imaging device according to still another aspect of the present invention, it is preferable that the third determination unit determines whether or not the imaging device is in the stationary state based on the output of the second filter, an output of the third filter, or an output of a tripod detection sensor which detects that the imaging device is attached to a tripod. In a case where the output of the second filter or the output of the third filter does not include the high frequency component corresponding to the hand-held imaging, it is possible to determine that the imaging device is in the stationary state. In a case where it is detected that the imaging device is attached to the tripod by the output of the tripod detection sensor, it is possible to determine that the imaging device is in the stationary state.

It is preferable that the shake detection device of an imaging device according to still another aspect of the present invention further comprises a second filter characteristic setting unit that sets a cutoff frequency of the first filter to be a frequency lower than a frequency in a case where the first determination unit determines that the imaging device is in the hand-held state and the fixed-point imaging state, in a case where the third determination unit determines that the imaging device is in the stationary state at the time of the calculation of the reference value shift amount for the reference value using the reference value shift amount calculation unit based on the output of the first filter. In a case where the imaging device is in the stationary state (in a case where the imaging device is not in the hand-held state), since the output of the shake detection sensor is originally only the output in a case where the imaging device is in the stationary state, only the drift component is extracted by setting the cutoff frequency of the first filter to be the frequency lower than the frequency in a case where it is determined that the imaging device is in the hand-held state and the fixed-point imaging state.

It is preferable that the shake detection device of an imaging device according to still another aspect of the present invention further comprises a first filter characteristic setting unit that sets a cutoff frequency of the third filter for removing the low frequency noise to be a frequency lower than a frequency before the correction of the output, in a case where the output after the subtraction of the reference value is corrected by using the reference value shift amount calculated in a case where it is determined that the imaging device is in the hand-held state and the fixed-point imaging state and a third filter characteristic setting unit that sets the cutoff frequency of the third filter for removing the low frequency noise to be a frequency lower than the cutoff frequency set by the first filter characteristic setting unit, in a case where the output after the subtraction of the reference value is corrected by using the reference value shift amount calculated in a case where it is determined that the imaging device is in the stationary state. In a case where the imaging device is in the stationary state, the accuracy of the calculated reference value shift amount becomes higher, and the sensor output obtained by correcting the output after the reference value subtraction by using the reference value shift amount is an output obtained by favorably removing the drift component. Accordingly, in this case, the third filter characteristic setting unit sets the cutoff frequency of the third filter for removing the low frequency noise to be the frequency lower than the cutoff frequency set by the first filter characteristic setting unit, and thus, an effective low frequency component is not removed.

It is preferable that the shake detection device of an imaging device according to still another aspect of the present invention further comprises a fourth determination unit that determines whether or not the imaging device pans and tilts. It is preferable that in a case where the fourth determination unit determines that the imaging device does not pan and tilt, the first determination unit determines whether or not the imaging device is in the hand-held state and the fixed-point imaging state. In a case where the imaging device pans and tilts, since the imaging device is not in the hand-held state and the fixed-point imaging state, it is not necessary to determine whether or not the imaging device is in the hand-held state and the fixed-point imaging state. Accordingly, it is determined whether or not the imaging device is in the hand-held state and the fixed-point imaging state only in a case where it is determined that the imaging device does not pan and tilt.

In the shake detection device of an imaging device according to still another aspect of the present invention, it is preferable that the fourth determination unit determines whether or not the imaging device pans and tilts based on an output of the third filter.

A shake correction device of an imaging device according to still another aspect of the present invention comprises the shake detection device of an imaging device described above, a shake angle calculation unit that integrates an output of the third filter and calculates a shake angle of the imaging device, a shake correction mechanism that drives a shake correction optical system or an imaging element of the imaging device, and a shake controller that controls the shake correction mechanism based on the shake angle calculated by the shake angle calculation unit.

According to still another aspect of the present invention, since high-accurate shake detection is performed by the shake detection device of the imaging device, it is possible to perform high-accurate shake correction based on the shake detection.

An imaging device according to still another aspect of the present invention comprises an imaging unit that includes an imaging optical system and an imaging element and the shake correction device of an imaging device described above.

A shake detection method of an imaging device according to still another aspect of the present invention comprises a step of obtaining an output of a shake detection sensor that detects shake occurring in the imaging device, a step of subtracting a reference value corresponding to the output of the shake detection sensor in a case where the imaging device is in a stationary state from the obtained output of the shake detection sensor, a step of extracting a low frequency component from an output after the subtraction of the reference value, a step of extracting a high frequency component from the output after the subtraction of the reference value, a step of determining whether or not the imaging device is in a hand-held state and a fixed-point imaging state based on the extracted low frequency component and high frequency component, a step of calculating the reference value shift amount for the reference value based on the low frequency component for a period during the determination is performed in a case where it is determined that the imaging device is in the hand-held state and the fixed-point imaging state, a step of correcting the output after the subtraction of the reference value by using the reference value shift amount, and a step of removing a low frequency noise from an output after the correction of the reference value shift amount.

According to the present invention, it is possible to accurately calculate a shift amount of a reference value of a shake detection sensor even in a case where the imaging device is in a hand-held state, and thus, it is possible to perform high-accurate shake detection. It is possible to accurately perform the shake correction of the imaging device through high-accurate shake detection.

DESCRIPTION OF THE PREFERRED EMBODIMENTS

Hereinafter, preferred embodiments of a shake detection device and a shake correction device of an imaging device, an imaging device, and a shake detection method according to the embodiment of the present invention will be described with reference to the accompanying drawings.

<Schematic Configuration of Imaging Device>

Figure 1:
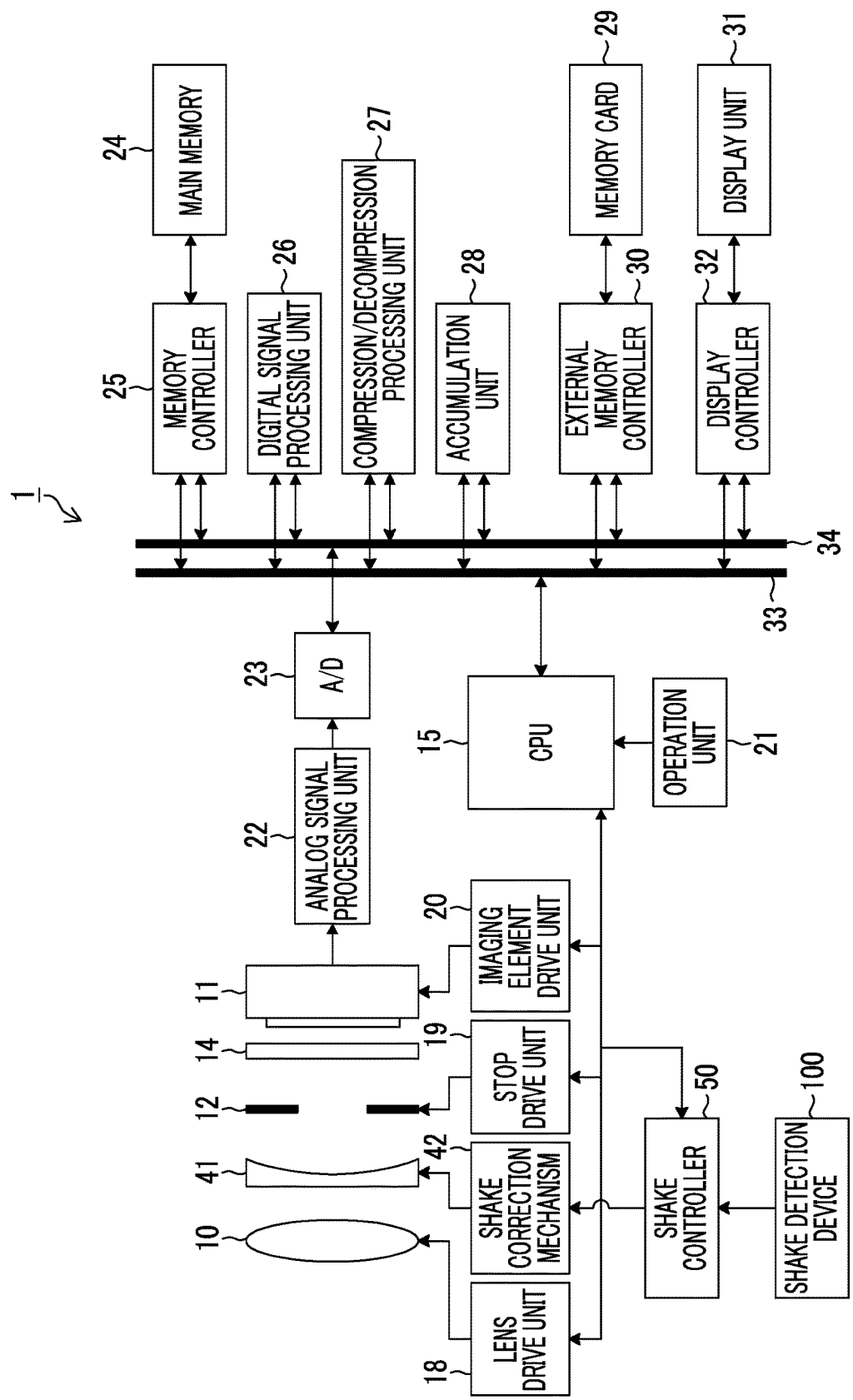
FIG. 1 is a block diagram showing a schematic configuration of an imaging device 1 according to the present invention.

FIG. 1 is a block diagram showing a schematic configuration of an imaging device 1 according to the embodiment of the present invention.

As shown in this diagram, the imaging device 1 of the present embodiment is a digital camera comprising an imaging lens (imaging optical system) 10 and an imaging element 11 constituting an imaging unit, a central processing unit (CPU) 15, an imaging element drive unit 20, an operation unit 21, an analog signal processing unit 22, an analog/digital (A/D) converter 23, a digital signal processing unit 26, a correction lens 41 functioning as a shake correction optical system, a shake correction mechanism 42, a shake controller 50, and a shake detection device 100.

The units are operated under the control of the CPU 15, and the CPU 15 controls the units of the imaging device 1 by executing a predetermined control program based on an input from the operation unit 21.

The CPU 15 has a program read only memory (ROM) therein, and various data items necessary for control in addition to a control program executed by the CPU 15 are recorded in the program ROM. The CPU 15 controls the units of the imaging device 1 by reading out the control program recorded in the program ROM into a main memory 24 and sequentially executing the readout control program.

The main memory 24 is used as a temporary storage area of image data or various work areas in addition to being used as an execution area of the program.

The operation unit 21 includes general operation means of a camera such as a release button, a power switch, an imaging mode dial, and a shake correction switch, and outputs a signal corresponding to an operation to the CPU 15.

Figure 2:
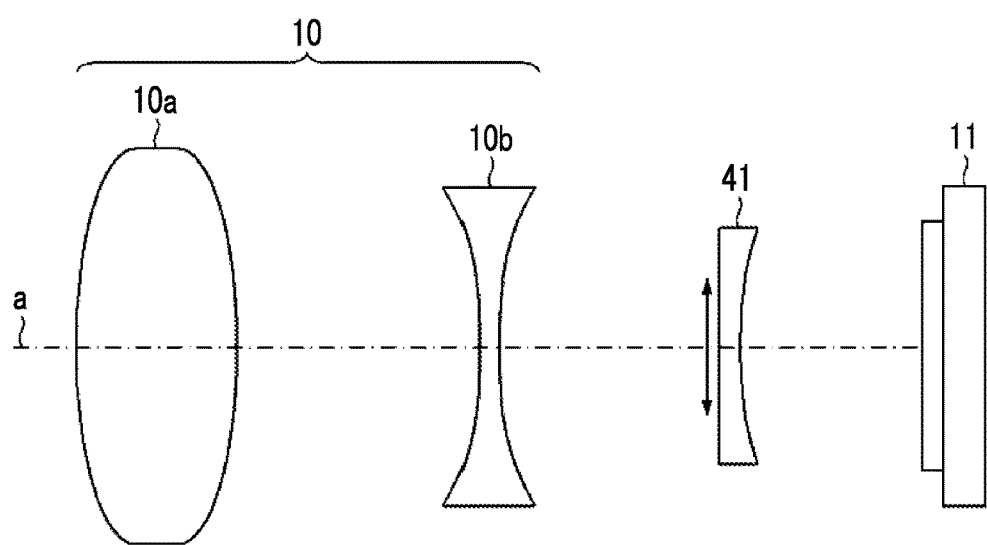
FIG. 2 is a diagram showing an optical system of the imaging device 1.

The imaging lens 10 includes a zoom lens 10a and a focus lens 10b (see FIG. 2). Based on a command from the CPU 15, the lens drive unit 18 changes an angle of view by moving the zoom lens 10a on an optical axis thereof forward and backward, and adjusts a focus by moving the focus lens 10b on an optical axis thereof forward and backward.

Subject light rays transmitted through the imaging lens 10 are received by the imaging element 11 through the correction lens 41, a stop 12, and an infrared cut filter 14.

The correction lens 41 is driven by the shake correction mechanism 42. The shake correction mechanism 42 supports the correction lens 41 in two directions (X direction and Y direction) crossing each other in a plane perpendicular to the optical axis, and moves the correction lens 41 in the X direction and the Y direction by using a voice coil motor (not shown).

The shake detection device 100 is provided to detect the shake (vibration) of the imaging device 1, and outputs a signal corresponding to an angular velocity of yaw and pitch of the imaging device 1. The shake controller 50 controls the shake correction mechanism 42 so as to move the correction lens 41 in an XY direction in a plane perpendicular to the optical axis according to an output signal of the shake detection device 100. The details of the shake correction will be described below.

12 denotes a stop, and a stop drive unit 19 adjusts such that an exposure amount of the imaging element 11 becomes an appropriate exposure amount by controlling an opening amount of the stop 12 based on a command from the CPU 15.

The infrared cut filter 14 removes infrared components of the subject light rays incident on the imaging element 11.

The imaging element 11 is constituted by a complementary metal-oxide semiconductor (CMOS) type color image sensor. The imaging element 11 is not limited to the CMOS type, and may be an XY address type or charge coupled device (CCD) type image sensor.

The imaging element 11 is constituted by a plurality of pixels arranged in a matrix form a predetermined pattern array (Bayer array, X-Trans (registered trademark) array, or honeycomb array), and each pixel includes a microlens, a red (R), green (G), or blue (B) color filter, and a photoelectric conversion unit (photodiode).

The subject light rays are formed on a light receiving surface of the imaging element 11 through the imaging lens 10, and are converted into electric signals by light-receiving elements. That is, each pixel of the imaging element 11 accumulates electric charges corresponding to an incident light amount, and an electric signal corresponding to an electric charge amount accumulated in each pixel is read out from the imaging element 11, as an image signal.

The imaging element drive unit 20 performs read control of the image signal from the imaging element 11 according to a command of the CPU 15. The imaging element drive unit 20 has an electronic shutter function of starting exposure by simultaneously discharging (resetting) the electric charges accumulated in the pixels of the imaging element 11 (all at once) according to an electronic shutter control signal from the CPU 15.

The analog signal processing unit 22 performs various analog signal processing on analog image signals obtained by imaging subjects through the imaging element 11. The analog signal processing unit 22 includes a sampling and holding circuit, a color separation circuit, and an AGC circuit. The AGC circuit functions as a sensitivity adjustment unit which adjusts sensitivity (International Organization for Standardization (ISO) sensitivity) at the time of imaging, and causes a signal level of an image signal to enter an appropriate range by adjusting a gain of an amplifier which amplifies an input image signal.

The A/D converter 23 converts the analog image signals output from the analog signal processing unit 22 into digital image signals. In a case where the imaging element 11 is a CMOS type imaging element, the analog signal processing unit 22 and the A/D converter 23 are built in the imaging element 11 in many cases.

In addition to the CPU 15 and a memory controller 25, the digital signal processing unit 26, a compression/decompression processing unit 27, an accumulation unit 28, an external memory controller 30, and a display controller 32 are connected to a control bus 33 and a data bus 34, and transmit and receive information to and from each other through the control bus 33 and the data bus 34.

At the time of imaging a still image or a motion picture, image data (mosaic image data) of each of RGB pixels output through the imaging element 11, the analog signal processing unit 22, and the A/D converter 23 is input to the main memory 24 through the memory controller 25, and is temporarily stored.

The digital signal processing unit 26 performs various digital signal processing on the image data stored in the main memory 24. The digital signal processing unit 26 of the present example appropriately reads out the image data stored in the main memory 24, performs digital signal processing such as offset processing, gain control processing including sensitivity correction, gamma-correction processing, demosaicing (referred to as a demosaicing process), and RGB/YCrCb conversion processing on the readout image data, and stores the image data after the digital signal processing in the main memory 24 again. For example, in a case where the imaging element is constituted by color filters of three RGB colors, the demosaicing is processing for calculating all RGB color information items for the pixels from an RGB mosaic image, and image data of three RGB colors demosaiced from the mosaic data (point-sequential RGB data) is generated.

The RGB/YCrCb conversion processing is processing for converting the demosaiced RGB data into luminance data (Y) and color difference data items (Cr, Cb).

The compression/decompression processing unit 27 compresses the uncompressed luminance data Y and color difference data items Cb and Cr stored in the main memory 24 at the time of recording the still image or the motion picture. The still image is compressed in, for example, a Joint Photographic coding Experts Group (JPEG) format, and the motion picture is compressed in, for example, an H.264 format. The image data compressed by the compression/decompression processing unit 27 is recorded in a memory card 29 through the external memory controller 30. The compression/decompression processing unit 27 generates the uncompressed image data by decompressing the compressed image data obtained from the memory card 29 through the external memory controller 30 at the time of a playback mode.

According to a command of the CPU 15, the accumulation unit 28 receives RGB image signals stored in the main memory 24, and calculates an accumulative value necessary for auto exposure (AE) control. The CPU 15 calculates a brightness value from the accumulative value, and obtains an exposure value from the brightness value. A stop value and a shutter speed are determined according to a predetermined program diagram from the exposure value.

The external memory controller 30 performs control for recording the image data compressed by the compression/decompression processing unit 27 in the memory card 29. The external memory controller 30 performs control for reading out the compressed image data from the memory card 29.

The display controller 32 performs control for displaying the uncompressed image data stored in the main memory 24 (or a video memory (not shown)) on a display unit 31. For example, the display unit 31 is constituted by a display device such as a liquid crystal display device or organic electroluminescence.

In a case where a live view image is displayed on the display unit 31, the digital image signals continuously generated by the digital signal processing unit 26 are temporarily stored in the main memory 24. The display controller 32 converts the digital image signals temporarily stored in the main memory 24 into signals in a display format, and sequentially outputs the converted signals to the display unit 31. Accordingly, the captured image may be displayed in real time on the display unit 31, and the display unit 31 may be used as an electronic view finder.

The display unit 31 is used as a display screen for a user interface.

<Principle of Camera Shake Correction>

Next, a principle of shake correction of the imaging device 1 will be described.

The imaging device 1 enables a user to switch between a camera shake ON mode and a camera shake OFF mode by using the operation unit 21. In the camera shake ON mode, the movement of the correction lens 41 is controlled such that a subject image blur (image blur) caused by the shake (camera shake) of the imaging device 1 is canceled. In the camera shake OFF mode, the movement of the correction lens 41 is controlled such that the correction lens is maintained in a stopped state.

FIG. 2 is a diagram showing an optical system of the imaging device 1.

The optical system of the imaging device 1 is composed of the zoom lens 10*a*, the focus lens 10*b*, and the correction lens 41. The imaging element 11 is disposed on an optical axis a of the optical system, and the imaging element 11 converts the subject light rays received as mentioned above into electrical signals.

In a case where the camera shake occurs in the imaging device 1, since an image of the subject moves on the imaging element 11 within one frame, the electrical signals of a blurred image are generated from the imaging element 11. The shake detection device 100 is provided within a camera body of the imaging device 1 in order to detect the occurrence of the camera shake.

The shake detection device 100 includes a gyro sensor 102 (see FIG. 3) functioning as a shake detection sensor, and detects angular velocities of a left and right direction (yaw) and an upper and lower direction (pitch) of the imaging device 1. The left and right direction and the upper and lower direction of the imaging device 1 respectively correspond to the X direction and the Y direction in which the correction lens 41 is driven by the shake correction mechanism 42.

The shake detection device 100 detects angular velocities of two axes (yaw and pitch) of the imaging device 1, and outputs angular velocity signals indicating the detected angular velocities.

The shake controller 50 integrates the angular velocity signals of the yaw and the pitch input from the shake detection device 100, generates angle signals (a yaw angle signal and a pitch angle signal) indicating shake angles of the yaw and the pitch of the imaging device 1 in real time, and moves the correction lens 41 in the left and right direction (X direction) and the upper and lower direction (Y direction) through the shake correction mechanism 42 such that image blurriness caused by the camera shake of the yaw and pitch of the imaging device 1 offsets based on the generated yaw angle signal and pitch angle signal.

The details of the shake detection device 100 and the shake controller 50 will be described below.

In a case where the camera shake does not occur, the optical axis of the correction lens 41 matches the optical axis a of the optical system. In a case where the camera shake is detected by the shake detection device 100, the correction lens 41 is moved in the X direction and/or Y direction by the shake correction mechanism 42 depending on the magnitude of the camera shake. Accordingly, the image formed on the imaging element 11 is in an approximately stopped state, and the image signal indicating a sharp image is output from the imaging element 11.

Although it has been described in this example that the image blurriness is corrected by moving the correction lens 41 in the X direction and the Y direction, the image blurriness may be corrected by moving the imaging element 11 in the X direction and the Y direction by the shake correction mechanism 42.

[Shake Correction Device]

Next, the shake correction device of the imaging device will be described.

Figure 3:
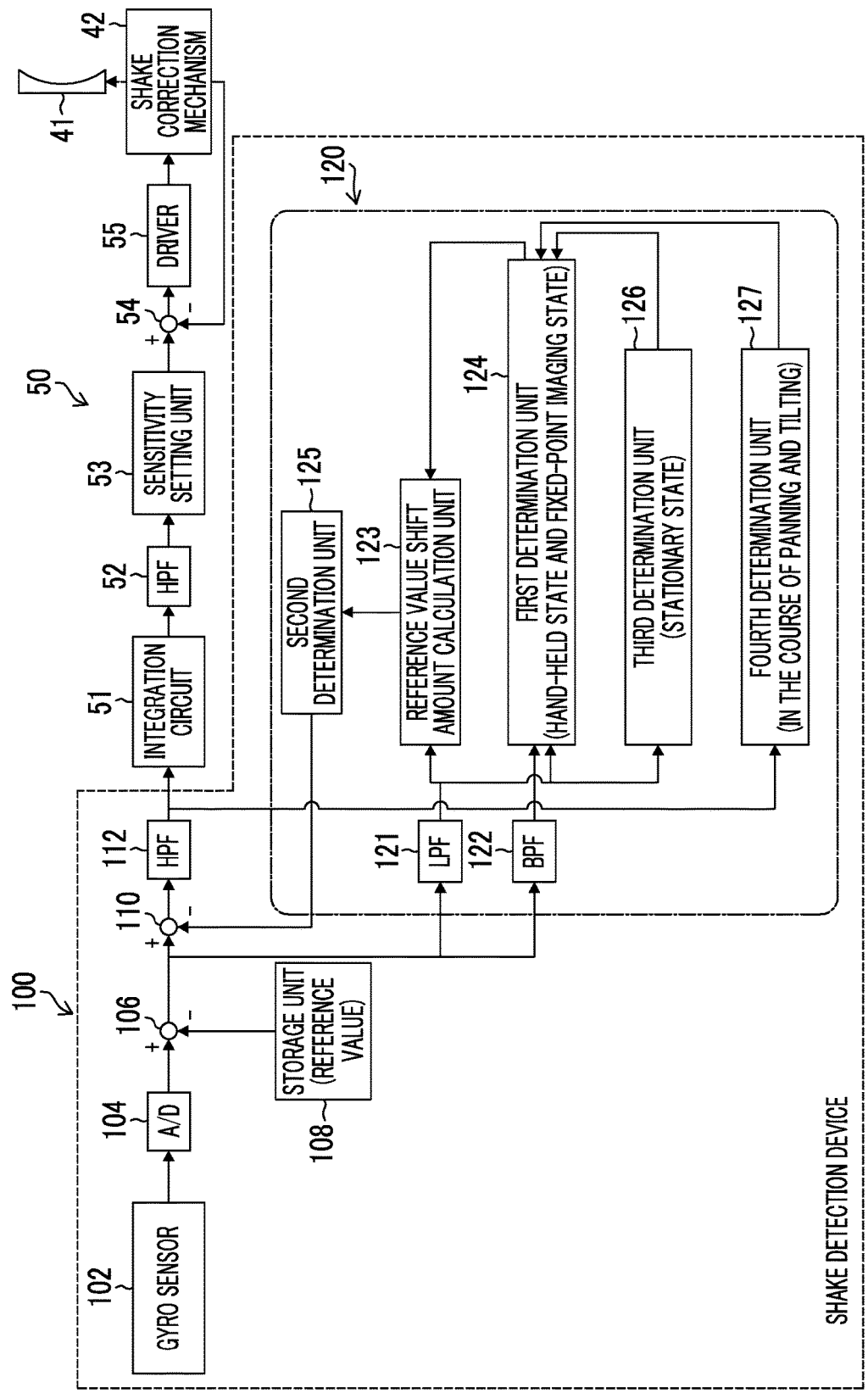
FIG. 3 is a block diagram showing an embodiment of a shake correction device including a shake detection device 100 of a first embodiment.

FIG. 3 is a block diagram showing an embodiment of the shake correction device of the imaging device according to the embodiment of the present invention.

The shake correction device shown in FIG. 3 mainly includes the correction lens 41, the shake correction mechanism 42, the shake controller 50, and the shake detection device 100, and is particularly characterized by the shake detection device 100.

Although it has been described that the shake detection device 100 constituting the shake correction device detects the angular velocities of the two axes (yaw and pitch) of the imaging device 1 and outputs the angular velocity signals indicating the detected angular velocities, a case where an angular velocity signal of one axis of the yaw or the pitch is output and the shake controller 50 corrects the image blurriness of one axis of the yaw or the pitch for simplicity of description will be described in FIG. 3.

The shake controller 50 includes an integration circuit 51, a high-pass filter (HPF) 52, a sensitivity setting unit 53, a subtraction unit 54, and a driver 55.

A digital angular velocity signal of one axis of the yaw or the pitch is output from the shake detection device 100, and is added to the integration circuit 51.

The integration circuit 51 functions as a shake angle detection unit that calculates the angle signal (detects the shake angle) in real time by integrating the input angular velocity signal. The calculated angle signal is output to the HPF 52. Only the angle signal corresponding to the angular velocity caused by the camera shake is extracted, and is output to the sensitivity setting unit 53 at the subsequent stage. Accordingly, in a case where the camera shake stops, an angle signal indicating 0° may be immediately output from the HPF 52, and may output a signal for moving (centering) the optical axis of the correction lens 41 on the optical axis a of the optical system.

The angle signal output from the HPF 52 is input to the sensitivity setting unit 53. Zoom information indicating a zoom magnification of the zoom lens 10*a* is applied to the sensitivity setting unit 53 from the CPU 15, and the sensitivity setting unit 53 multiplies the input angle signal by a correction gain value corresponding to the zoom information (zoom magnification) based on the zoom information, and outputs a target position command value indicating a target position of the correction lens 41 to the subtraction unit 54.

A position detection value indicating the current position of the correction lens 41 is applied to another input of the subtraction unit 54 from the shake correction mechanism 42, and the subtraction unit 54 outputs a difference value between the target position command value and the position detection value to the driver 55.

The driver 55 moves the correction lens 41 with a desired amount in a desired direction by supplying a current having an orientation corresponding to a sign of the input difference value to a voice coil motor (not shown) of the shake correction mechanism 42 with a current value corresponding to the magnitude of the input difference value.

The correction lens 41 is moved such that the difference value between the target position command value and the position detection value is constantly zero, and thus, it is possible to prevent the image blurriness from occurring in the subject image to be received by the imaging element 11 even though the camera shake occurs in the imaging device 1.

<First Embodiment of Shake Detection Device>

Next, a first embodiment of the shake detection device according to the embodiment of the present invention will be described.

The shake correction device shown in FIG. 3 includes the shake detection device 100 of the first embodiment.

The shake detection device 100 mainly includes the gyro sensor 102 functioning as a shake detection sensor, an A/D converter 104, subtraction units 106 and 110, a storage unit 108, an HPF 112 functioning as a third filter, and a reference value correction unit 120.

Although the gyro sensor 102 detects the angular velocities of the two axes (yaw and pitch) of the imaging device 1 and outputs the analog angular velocity signals indicating the detected angular velocities, it is assumed in FIG. 3 that the angular velocity signal of one axis of the yaw or the pitch is output as stated above for simplicity of description.

The angular velocity signal output from the gyro sensor 102 is converted into the digital angular velocity signal by the A/D converter 104, and is output to the subtraction unit 106.

A reference value stored in the storage unit 108 is applied to another input of the subtraction unit 106. The subtraction unit 106 subtracts the reference value from the angular velocity signal, and outputs the angular velocity signal after the reference value is subtracted to the subtraction unit 110 and the reference value correction unit 120 functioning as the correction unit of the reference value.

In this example, the reference value stored in the storage unit 108 is a value corresponding to the output of the A/D converter 104 in a state in which the imaging device 1 is in a stationary state. It is preferable that the reference value is a value output (measured) output by the gyro sensor 102 at a reference temperature (for example, 20° C.). This is because the output of the gyro sensor 102 does not become zero even in a case where the imaging device is in the stationary state, and a bias value (reference value) is superimposed.

Since this reference value (referred to as a "zero point") is changed (drifted) by an ambient temperature or a time change, in a case where the angle is obtained by integrating the angular velocity value, the angle is changed even in the stationary state by the drift. The reference value correction unit 120 is a unit that calculates a shift amount (reference value shift amount) of the reference value due to the drifting.

The reference value shift amount calculated by the reference value correction unit 120 is applied to another input of the subtraction unit 110 to which the angular velocity signal after the reference value subtraction is input. The subtraction unit 110 further subtracts the reference value shift amount from the angular velocity signal after the reference value subtraction, and outputs the angular velocity signal after the subtraction of the reference value shift amount to the HPF 112.

The HPF 112 removes low frequency noise from the angular velocity signal after the subtraction of the reference value shift amount input from the subtraction unit 110, and outputs the angular velocity signal obtained by removing the low frequency noise to the integration circuit 51 of the shake controller 50. In a case where the imaging device 1 is in a hand-held state (in the case of hand-held imaging), since the frequency of the shake is about 10 Hz, it is preferable that a cutoff frequency of the HPF 112 for removing the low frequency noise is determined based on the frequency of the shake.

Next, the reference value correction unit 120 will be described.

The reference value correction unit 120 mainly includes a low-pass filter (LPF) 121 functioning as a first filter, a band-pass filter (BPF) 122 functioning as a second filter, a reference value shift amount calculation unit 123, a first determination unit 124, a second determination unit 125, a third determination unit 126, and a fourth determination unit 127.

The angular velocity signal after the reference value subtraction which is output from the subtraction unit 106 is applied to the LPF 121 and the BPF 122.

The LPF 121 extracts a low frequency component from the input angular velocity signal after the reference value subtraction, and transmits the extracted low frequency component (hereinafter, referred to as an "LPF output") to the reference value shift amount calculation unit 123, the first determination unit 124, the third determination unit 126, and the fourth determination unit 127.

The BPF 122 extracts a high frequency component from the input angular velocity signal after the reference value subtraction, and transmits the extracted high frequency component (hereinafter, referred to as a "BPF output") to the first determination unit 124. In a case where the high frequency noise is not included in the angular velocity signal after the reference value subtraction, the HPF may be used as the BPF 122.

The first determination unit 124 determines whether or not the imaging device 1 is in the hand-held state and a fixed-point imaging state based on the LPF output and the BPF output. In this example, the fixed-point imaging state is a state in which the imaging device 1 is held toward a stationary main subject (fixed point), and is a state in which the imaging device 1 does not pan and tilt.

The third determination unit 126 determines whether or not the imaging device 1 is in the stationary state based on the LPF output. In this example, the stationary state is not in a state in which the imaging device 1 is in the hand-held state, for example, a state in which the imaging device 1 is fixed to a tripod and the camera shake does not occur in the imaging device 1. The third determination unit 126 may determine whether or not the imaging device is in the stationary state based on an output of a tripod detection sensor (not shown).

The angular velocity signal output from the HPF 112 is applied to the fourth determination unit 127, and the fourth determination unit 127 determines whether or not the imaging device 1 pans and tilts based on the input angular velocity signal. As for the determination of whether or not the imaging device pans and tilts, the fourth determination unit 127 can determine that the imaging device pans and tilts (is panning or is tilting) in a case where the sign of the angular velocity indicates the same direction based on the input angular velocity signal and a state in which the angular velocity is equal to or greater than a predetermined value is continued.

The determination results of the third determination unit 126 and the fourth determination unit 127 are applied to the first determination unit 124. In a case where the third determination unit 126 determines that the imaging device is a non-stationary state and the fourth determination unit 127 determines that the imaging device 1 does not pan and tilt, the first determination unit 124 performs a determination process of the fixed-point imaging state. In a case where the imaging device 1 is in the stationary state and in a case where the imaging device 1 pans and tilts, it is apparent that the imaging device is not in the fixed-point imaging state. In these cases, it is not necessary to perform the determination process of the fixed-point imaging state.

The determination of the fourth determination unit 127 which determines that the imaging device does not pan and tilt does not mean the determination of the fixed-point imaging state which does not include a state in which the imaging device is in a panning operation and in a tilting operation at a very low speed. The determination of the fourth determination unit 127 which determines whether or not the imaging device pans and tilts is not limited to be performed in a case where the fourth determination unit performs the determination based on the angular velocity signal output from the HPF 112, and may be performed in, for example, a case where the fourth determination unit performs the determination based on the BPF output or the angle signal output from the integration circuit 51.

In a case where the first determination unit 124 determines that the imaging device 1 is in the hand-held state and the fixed-point imaging state, the reference value shift amount calculation unit 123 calculates the reference value shift amount for the reference value based on the LPF output for a period during which the determination is performed.

<Determination Process of Fixed-Point Imaging State>

Next, the determination process of the fixed-point imaging state performed by the first determination unit 124 will be described.

Figure 4:
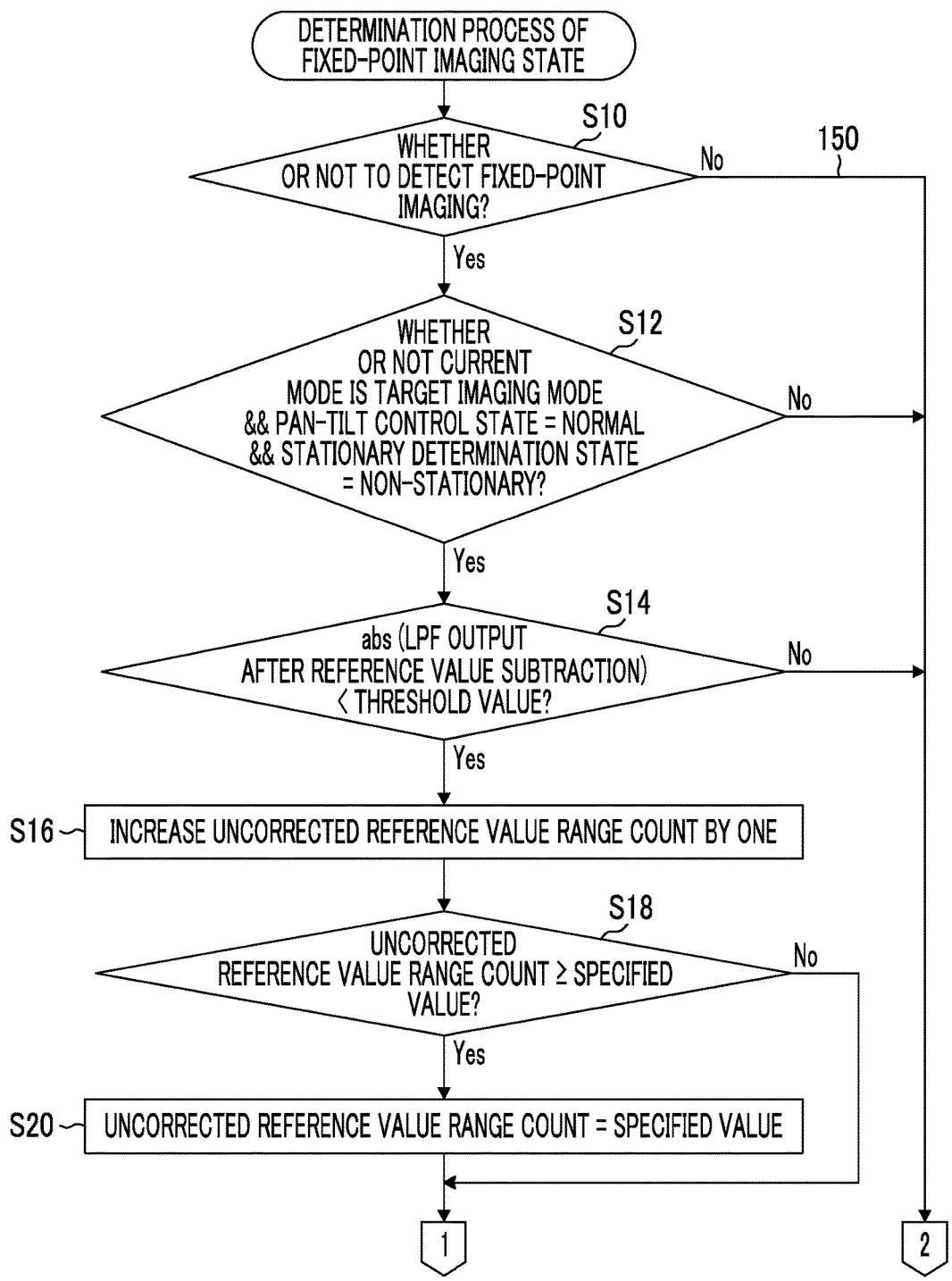
FIG. 4 is a flowchart showing a determination process of a fixed-point imaging state performed by a first determination unit 124.
Figure 5:
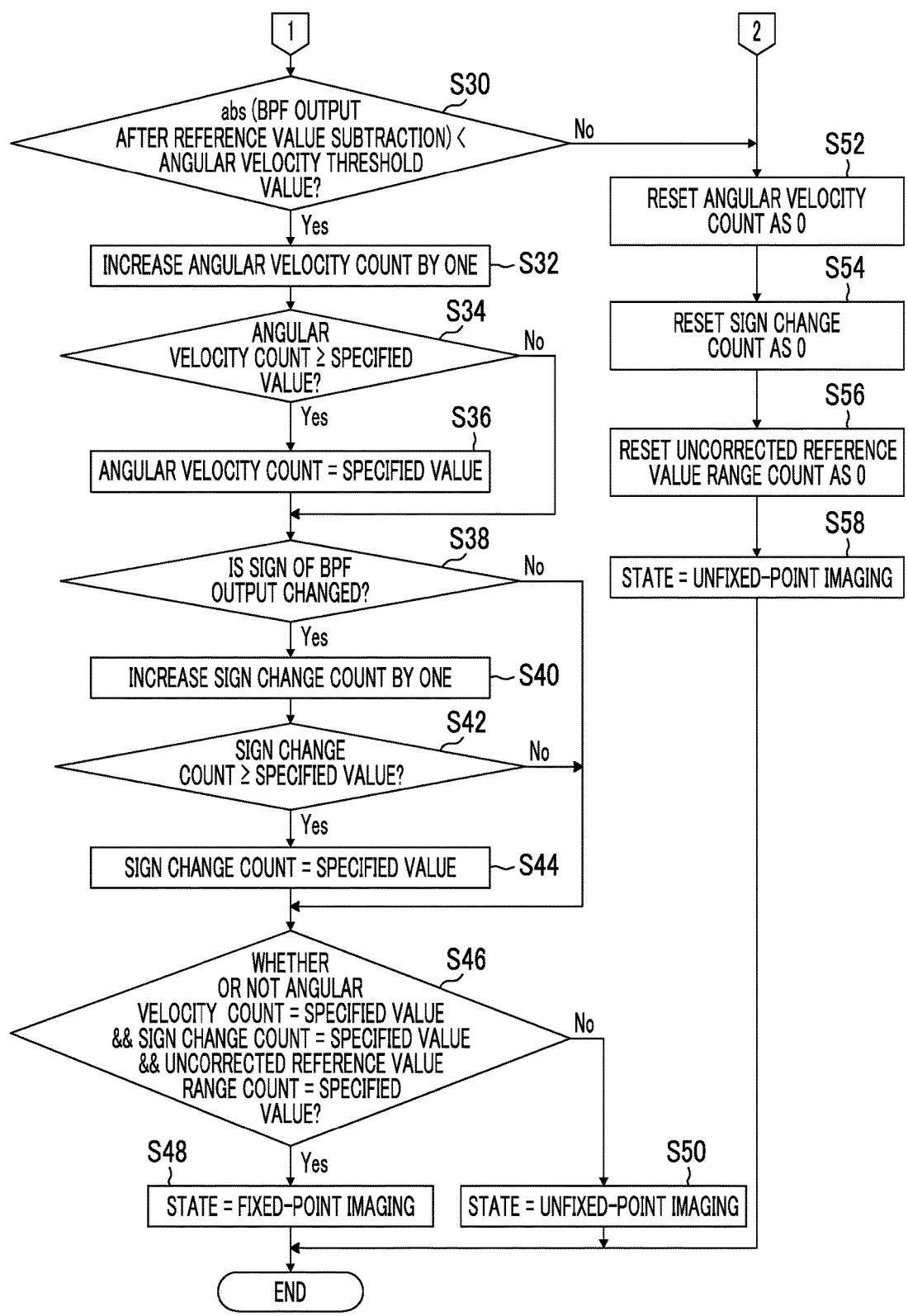
FIG. 5 is a flowchart showing the determination process of the fixed-point imaging state performed by the first determination unit 124.

FIGS. 4 and 5 are flowcharts showing the determination process of the fixed-point imaging state performed by the first determination unit 124.

In FIG. 4, the first determination unit 124 determines whether or not to detect the fixed-point imaging state (step S10). For example, in a case where the imaging device 1 is set in the playback mode, since it is not necessary to detect the fixed-point imaging state, the first determination unit 124 proceeds to step S52 of FIG. 5 according to a flow line 150, resets three counts (angular velocity count, a sign change count, and a uncorrected reference value range count) as zero (0) in steps S52, S54, and S56, and sets a state flag as "unfixed-point imaging" (step S58).

In a case where it is determined to detect the fixed-point imaging state in step S10 (in the case of "Yes"), the process proceeds to step S12.

In step S12, the first determination unit determines whether or not the current mode is a target imaging mode, whether or not a pan-tilt control state is "normal", and whether or not a stationary determination state is "non-stationary". In this example, in the determination of whether or not the current mode is the target imaging mode, the first determination unit can determine that the current mode is the target imaging mode in the case of the camera shake ON mode in the imaging mode. In the determination of whether or not the pan-tilt control state is "normal", the first determination unit can perform the determination by using the determination result of the fourth determination unit 127 which determines whether the imaging device pans and tilts. A case where the pan-tilt control state is "normal" means that the imaging device does not pan and tilt. In the determination of whether or not the non-stationary determination state is "non-stationary", the first determination unit can perform the determination by using the determination result of the stationary state performed by the third determination unit 126.

In a case where three conditions in which the current mode is the target imaging mode, the pan-tilt control state is "normal", and the stationary determination state is "non-stationary" are satisfied in step S12 (in the case of "Yes"), the process proceeds to step S14. In a case where one or more conditions of the three conditions are not satisfied, the process proceeds to step S52 of FIG. 5 according to the flow line 150.

In step S14, the first determination unit determines whether or not an absolute value of the LPF output after the reference value subtraction is less than a threshold value (the LPF output is within a first output width). In a case where the absolute value thereof is less than the threshold value (in the case of "Yes"), the first determination unit increases the uncorrected reference value range count by one (step S16), and proceeds to step S18. Meanwhile, in a case where the absolute value thereof is equal to or greater than the threshold value (in the case of "No"), the first determination unit proceeds to step S52 of FIG. 5 according to the flow line 150.

It is preferable that the threshold value (first output width) is determined so as to correspond to a "drift width" of the gyro sensor 102. Accordingly, it is possible to distinguish between the LPF output caused by the drifting of the gyro sensor 102 and the LPF output caused by the panning operation and the tilting operation at the very low speed.

In step S18, the first determination unit determines whether or not the uncorrected reference value range count is equal to or greater than a specified value. In a case where the uncorrected reference value range count is equal to or greater than the specified value (in the case of "Yes"), the process proceeds to step S30 of FIG. 5 after the uncorrected reference value range count is restricted to the specified value (step S20). In a case where the uncorrected reference value range count is less than the specified value (in the case of "No"), step S20 is skipped, and the process proceeds to step S30 of FIG. 5.

Although it has been described in this example that the determination process of the fixed-point imaging state is repeatedly performed in a predetermined cycle (for example, a sampling cycle of the angular velocity signal output from the gyro sensor 102 in the A/D converter 104), it is preferable that the specified value of the uncorrected reference value range count is determined so as to correspond to a uncorrected reference value range count continuously counted for a specified time of about one second to several seconds.

In FIG. 5, in step S30, the first determination unit determines whether or not the absolute value of the BPF output after the reference value subtraction is less than an angular velocity threshold value (the BPF output is within a second output width). In a case where the BPF output is less than the angular velocity threshold value (in the case of "Yes"), the angular velocity count increases by one (step S32), and the process proceeds to step S34. Meanwhile, in a case where the BPF output is equal to or greater than the angular velocity threshold value (in the case of "No"), the process proceeds to step S52.

It is preferable that the "angular velocity threshold value" as the determination reference in step S30 is determined so as to correspond to the angular velocity of the general camera shake of the camera. This is because a case where the angular velocity which exceeds the angular velocity of the camera shake is generated is not the fixed-point imaging state. Thus, in the case of the hand-held imaging, the angular velocity of the camera shake is about ±0.017 to 0.052 (rad/s).

In step S34, the first determination unit determines whether or not the angular velocity count is equal to or greater than the specified value. In a case where the angular velocity count is equal to or greater than the specified value (in the case of "Yes"), the process proceeds to step S38 after the angular velocity count is restricted to the specified value (step S36). In a case where the angular velocity count is less than the specified value (in the case of "No"), step S36 is skipped, and the process proceeds to step S38.

In step S38, the first determination unit determines whether or not the sign of the BPF output after the reference value subtraction is changed. In a case where the sign of the BPF output is changed (in the case of "Yes"), the sign change count increases by one (step S40), and the process proceeds to step S42. Meanwhile, in a case where the sign of the BPF output is not changed (in the case of "No"), step S46 is skipped.

In step S42, the first determination unit determines whether or not the sign change count is equal to or greater than the specified value. In a case where the sign change count is equal to or greater than the specified value (in the case of "Yes"), the process proceeds to step S46 after the sign change count is restricted to the specified value (step S44). In a case where the sign change count is less than the specified value (in the case of "No"), step S44 is skipped, and the process proceeds to step S46.

It is preferable that the specified value as the determination reference in step S42 is determined so as to correspond to the number of times the sign of the angular velocity signal (BPF output) is changed for a predetermined specified time (about one second to several seconds) due to the general camera shake of the camera. Thus, in the case of the hand-held imaging, the frequency of the camera shake is about 10 Hz.

In step S46, the first determination unit determines whether or not three counts (the angular velocity count, the sign change count, and the uncorrected reference value range count) reach the specified value. In a case where the three counts reach the specified value (in the case of "Yes"), the state flag is set as "fixed-point imaging" (step S48). In a case where at least one or more of the three counts do not reach the specified value (in the case of "No"), the state flag is set as "unfixed-point imaging" (step S50).

The first determination unit further determines whether or not the imaging device is in the fixed-point imaging state based on the LPF output and the BPF output while determining that the imaging device 1 is not in the hand-held state (non-transitionary) and does not pan and tilt (normal).

In this example, the fixed-point imaging state is determined based on the fact that the LPF output is less than the threshold value over the specified time in addition to the fact that the BPF output is less than the threshold value over the specified time and the number of times the sign of the BPF output is changed within the specified time is equal to or greater than the specified value. Accordingly, it is possible to detect a minute angular velocity signal which is not able to be determined due to the high frequency noise included in the angular velocity signal after the specified value subtraction.

Figure 6:
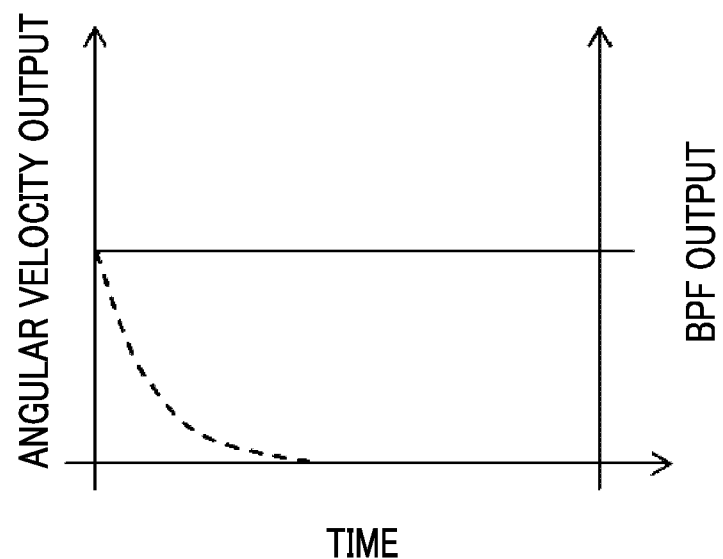
FIG. 6 is a graph showing changes in angular velocity output and a BPF output with time at the time of panning.

FIG. 6 is a graph showing changes in angular velocity output and BPF output with time at the time of panning. The angular velocity output is represented by a solid line, and the BPF output is represented by a broken line. As shown in this drawing, the BPF output decreases with time with respect to an input of a predetermined angular velocity output at the time of panning. Accordingly, only the BPF output is a direct current component to be removed, it is not possible to detect the panning at a low speed, but it is possible to determine the palming at the low speed by using the LPF output.

That is, it is possible to accurately determine whether or not the imaging device is in the fixed-point imaging state based on the LPF output and the BPF output, and the first determination unit does not erroneously determine that a state in which the imaging device is in the panning operation or the tilting operation at the very low speed is the fixed-point imaging state.

Referring back to FIG. 3, in a case where the first determination unit 124 determines that the imaging device 1 is in the hand-held state and the fixed-point imaging state as described above, the reference value shift amount calculation unit 123 calculates the reference value shift amount for the reference value based on the LPF output for the period during which the determination is performed. That is, the reference value shift amount calculation unit 123 calculates the reference value shift amount by a method of calculating an average, a median, or a mode of the LPF outputs from a result obtained by measuring the LPF output for a predetermined period at the time of the fixed-point imaging state (the state flag is "fixed-point imaging), and outputs the calculated reference value shift amount to the second determination unit 125.

The second determination unit 125 outputs the reference value shift amount input from the reference value shift amount calculation unit 123 to the subtraction unit 110, as a correction term of the reference value under a predetermined condition.

The subtraction unit 110 further subtracts the reference value shift amount from the angular velocity signal after the specified value subtraction as described above, and outputs the angular velocity signal after the subtraction of the reference value shift amount to the HPF 112.

<First Correction Process>

Next, a first correction process of correcting a shift of the reference value of the gyro sensor 102 will be described.

Figure 7:
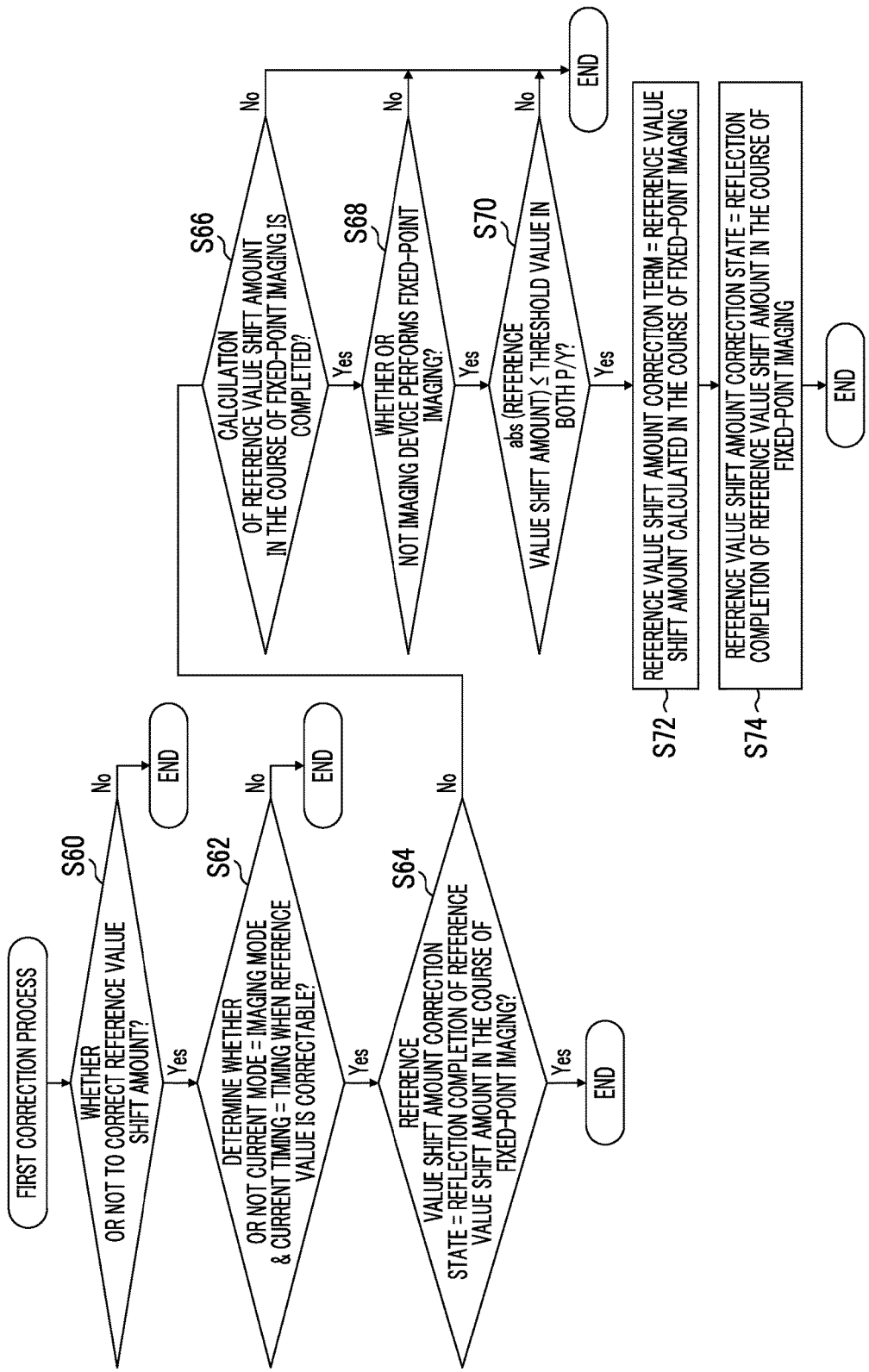
FIG. 7 is a flowchart showing a first correction process performed by the shake detection device 100 of the first embodiment shown in FIG. 3.

FIG. 7 is a flowchart showing the first correction process performed by the shake detection device 100 of the first embodiment shown in FIG. 3.

In FIG. 7, the second determination unit 125 determines whether or not to correct the reference value using the reference value shift amount (step S60). In a case where it is determined to correct the reference value (in the case of "Yes"), the second determination unit determines whether or not the current mode is the imaging mode and the current timing is an imaging timing when the reference value is correctable (step S62). In the case of "Yes", the process proceeds to step S64. In this step, the second determination unit determines whether or not a reference value shift amount correction state is "reflection completion of reference value shift amount in the course of fixed-point imaging". As will be shown in steps S72 and S74 to be described below, in a case where the reference value shift amount calculated by the reference value shift amount calculation unit 123 is used as the correction term of the reference value, the reference value shift amount correction state is regarded as "reflection completion of reference value shift amount in the course of fixed-point imaging".

In a case where it is determined that the reference value shift amount correction state is not "reflection completion of reference value shift amount in the course of fixed-point imaging in step S64 (in the case of "No"), the second determination unit determines whether or not the calculation of the reference value shift amount performed in the course of fixed-point imaging is completed and whether or not the imaging device performs the fixed-point imaging (steps S66 and S68).

In a case where the determination results of steps S66 and S68 are "Yes", the second determination unit 125 determines whether or not both the absolute values of the reference value shift amounts of the calculated pitch (P) and yaw (Y) are equal to or less than a threshold value (the reference value shift amount is within a predetermined range) (step S70). For example, it is preferable that this threshold value is determined so as to correspond to a temperature drift of the gyro sensor 102.

In a case where both the absolute values of the calculated reference value shift amounts are equal to or less than the threshold value (in the case of "Yes"), the second determination unit 125 uses the reference value shift amount calculated in the course of fixed-point imaging (the reference value shift amount input from the reference value shift amount calculation unit 123), as the correction term of the reference value (reference value shift amount correction term) (step S72).

In a case where the reference value shift amount calculated in the course of fixed-point imaging is used as the reference value shift amount correction term, the second determination unit 125 outputs the reference value shift amount correction term to the subtraction unit 110. Accordingly, the angular velocity signal after the reference value subtraction is corrected by the subtraction unit 110 by the reference value shift amount.

In a case where the reference value shift amount calculated by the reference value shift amount calculation unit 123 is used as the reference value shift amount correction term, the second determination unit 125 sets the reference value shift amount correction state as "reflection completion of reference value shift amount in the course of fixed-point imaging" (step S74).

<Second Embodiment of Shake Detection Device>

Next, a second embodiment of the shake detection device according to the embodiment of the present invention will be described.

Figure 8:
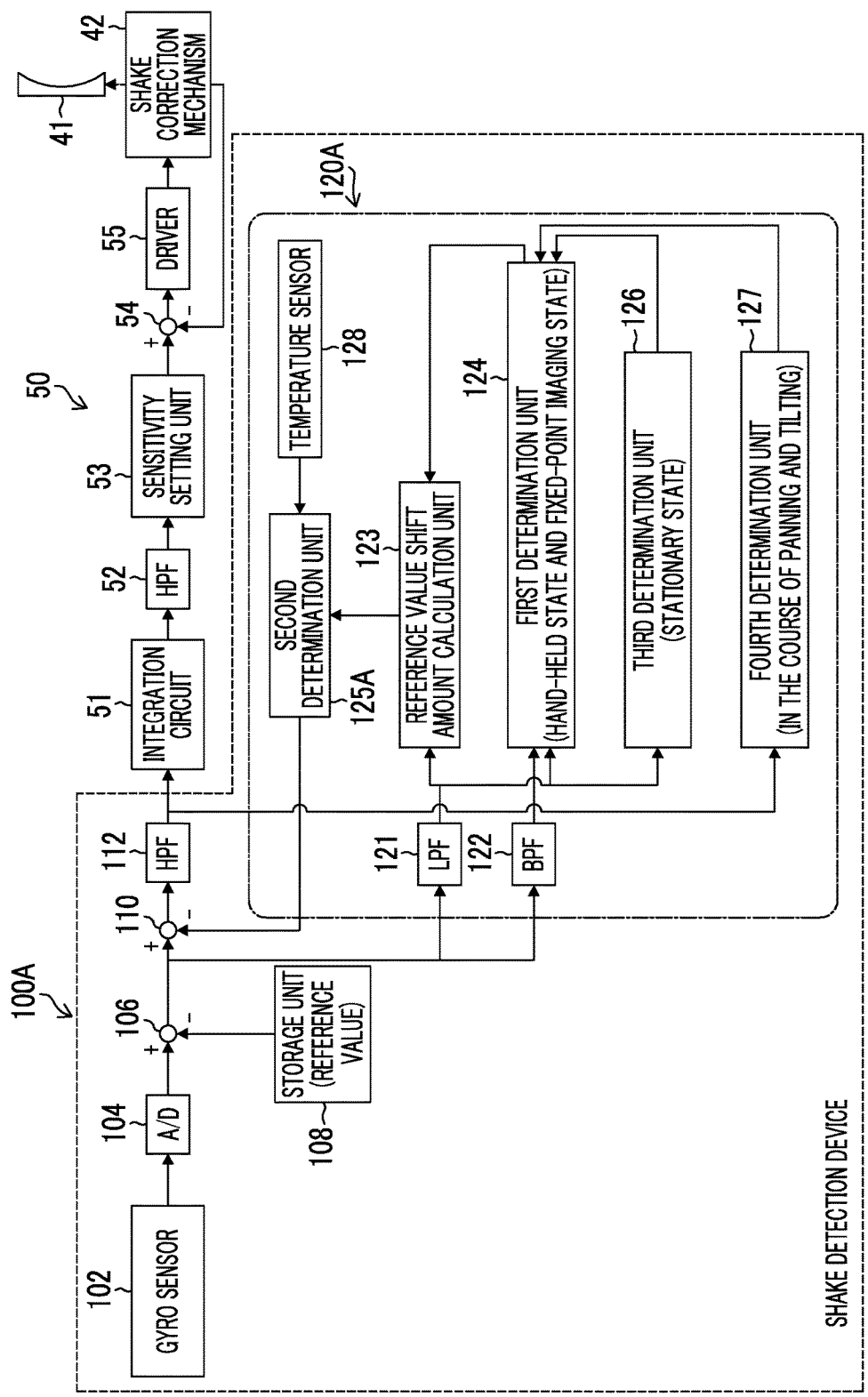
FIG. 8 is a block diagram showing an embodiment of a shake correction device including a shake detection device 100A of a second embodiment.

A shake correction device shown in FIG. 8 includes a shake detection device 100A of the second embodiment. In FIG. 8, portions in common with those in the shake detection device 100 of the first embodiment shown in FIG. 3 will be assigned the same references, and the detailed description thereof will be omitted.

In the shake detection device 100A of the second embodiment shown in FIG. 8, a reference value correction unit 120A is different from the reference value correction unit 120 of the shake detection device 100 of the first embodiment. Particularly, the reference value correction unit 120A is different from the reference value correction unit 120 of the shake detection device 100 of the first embodiment in that a temperature sensor 128 is added and the determination content of a second determination unit 125A is different.

The temperature sensor 128 detects a temperature of the imaging device 1 (gyro sensor 102), and outputs temperature information indicating the detected temperature to the second determination unit 125A.

The second determination unit 125A further determines whether or not the reference value shift amount calculated in the course of fixed-point imaging is reflected as the correction term of the reference value based on the temperature information input from the temperature sensor 128. That is, in a case where it is determined that a difference between a current temperature and a reference temperature at the time of measuring the reference value stored in the storage unit 108 is equal to or greater than the specified value and the reference value shift amount calculated in the course of fixed-point imaging is within the predetermined range set according to the current temperature, the second determination unit 125A reflects the reference value shift amount as the correction term of the reference value.

This is because the reference value shift amount is mainly generated due to the temperature drift of the gyro sensor 102 and the temperature drift is correlated with the temperature of the gyro sensor 102.

<Second Correction Process>

Figure 9:
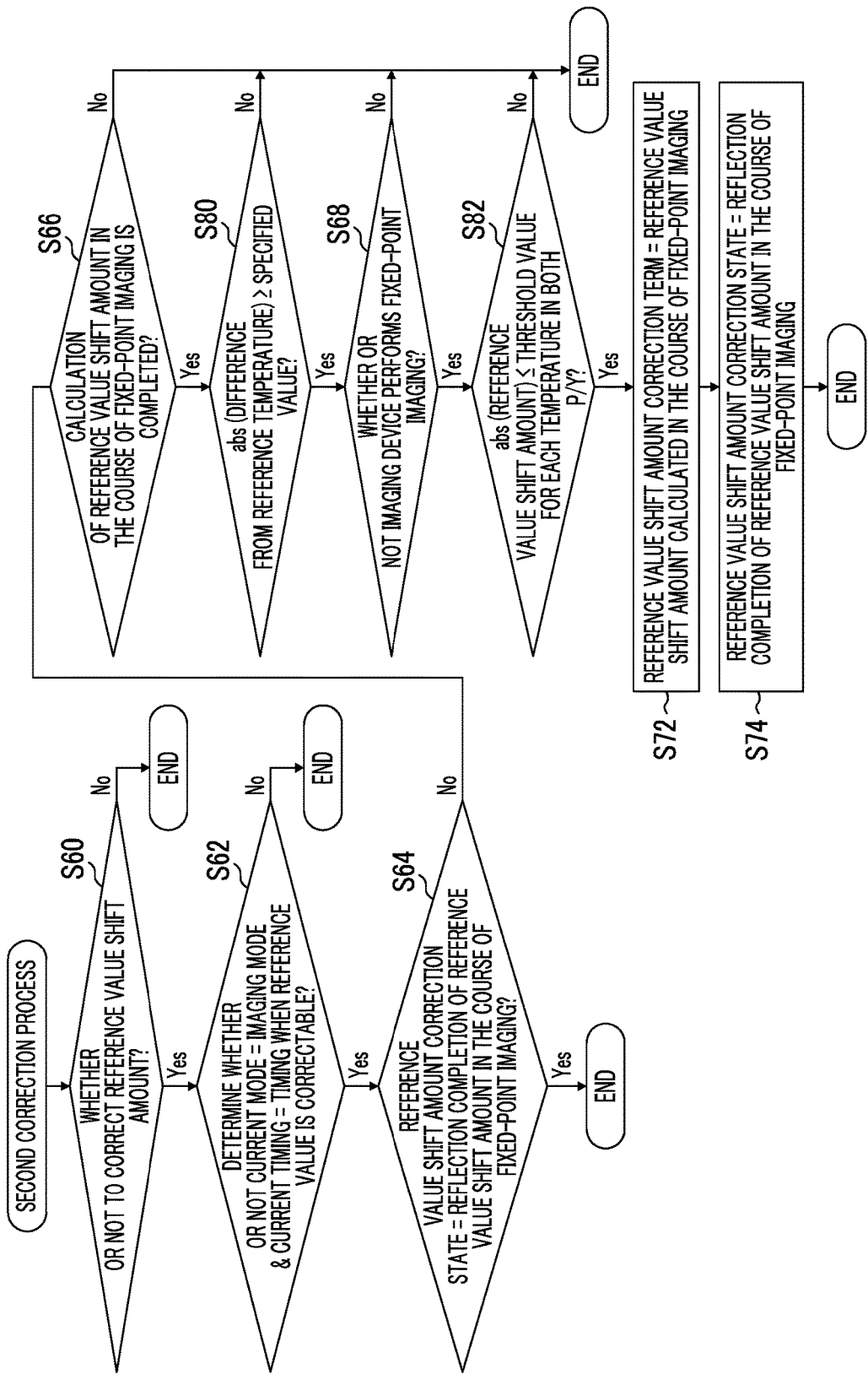
FIG. 9 is a flowchart showing a second correction process performed by the shake detection device 100A of the second embodiment shown in FIG. 8.

FIG. 9 is a flowchart showing a second correction process performed by the shake detection device 100A of the second embodiment shown in FIG. 8. Portions in common with those in the first correction process shown in FIG. 7 will be assigned the same step numbers, and the detailed description thereof will be omitted.

As shown in FIG. 9, the second correction process is different from the first correction process in that the process of step S80 is added between step S66 and step S68 and the process of step S82 is performed instead of step S70 of the first correction process shown in FIG. 7.

In step S80, the second determination unit determines whether or not an absolute value of the difference between the reference temperature at the time of measuring the reference value stored in the storage unit 108 and the current temperature detected by the temperature sensor 128 is equal to or greater than the specified value.

In a case where the absolute thereof is less than the specified value (in the case of "No"), the second determination unit determines that the reference value shift amount calculated in the course of fixed-point imaging is not generated due to the temperature drift of the gyro sensor 102, and does not reflect the calculated reference value shift amount as the correction term of the reference value.

In a case where the absolute thereof is equal to or greater than the specified value (in the case of "Yes"), the second determination unit determines whether or not the imaging device performs the fixed-point imaging (step S68), and determines whether or not both the absolute values of the reference value shift amounts of the pitch (P) and the yaw (Y) are equal to or less than a threshold value for each temperature (are within a predetermined range for each temperature set according to the temperature detected by the temperature sensor 128) (step S82). Since the threshold value for each temperature can be set as a higher-accurate threshold value which corresponds to the temperature drift of the gyro sensor 102. Accordingly, it is possible to determine whether or not the calculated reference value shift amount is accurate, and it is possible to correct a high-accurate reference value.

<Third Embodiment of Shake Detection Device>

Next, a third embodiment of the shake detection device according to the embodiment of the present invention will be described.

Figure 10:
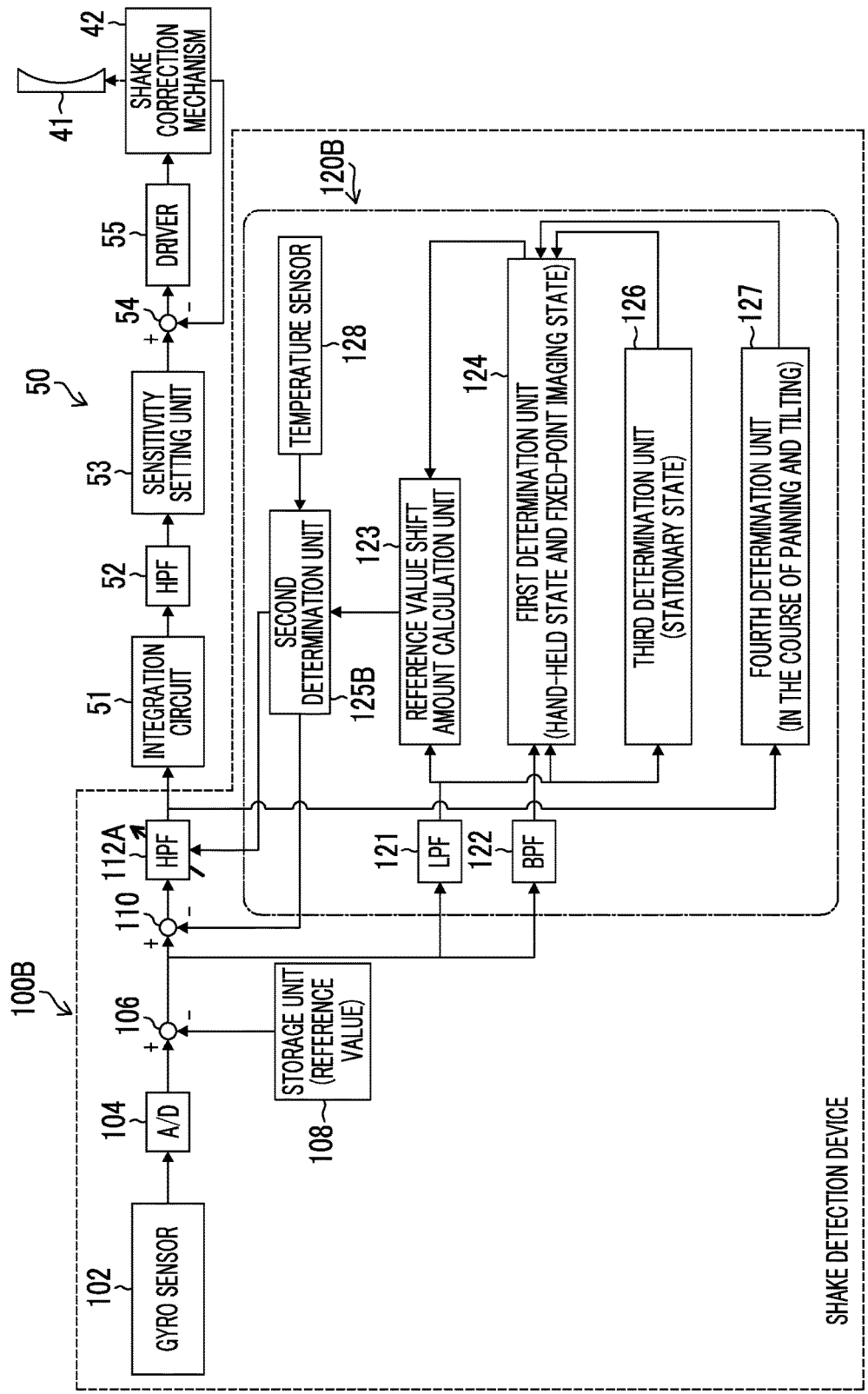
FIG. 10 is a block diagram showing an embodiment of a shake correction device including a shake detection device 100B of a third embodiment.

The shake correction device shown in FIG. 10 includes a shake detection device 100B of the third embodiment. In FIG. 10, portions in common with those in the shake detection device 100A of the second embodiment shown in FIG. 8 will be assigned the same references, and the detailed description thereof will be omitted.

In the shake detection device 100B of the third embodiment shown in FIG. 10, a reference value correction unit 120B is different from the reference value correction unit 120A of the second embodiment and an HPF 112A and a second determination unit 125B are particularly different from the HPF 112 and the second determination unit 125A of the shake detection device 100A of the second embodiment.

The second determination unit 125B has the same function as that of the second determination unit 125A of the shake detection device 100A of the second embodiment, and also has a function of a first filter characteristic setting unit that sets a cutoff frequency of the HPF 112A. That is, in a case where the reference value shift amount calculated by the reference value shift amount calculation unit 123 is reflected as the correction term of the reference value, the second determination unit 125B outputs a command for changing the cutoff frequency of the HPF 112A to a low frequency to the HPF 112A.

Meanwhile, the HPF 112A can change the cutoff frequency according to the command from the second determination unit 125B, and changes the cutoff frequency between at least a cutoff frequency (first cutoff frequency) before the reference value shift amount is reflected as the correction term of the reference value and a cutoff frequency (second cutoff frequency) after the reference value shift amount is reflected. It is preferable that the first cutoff frequency is equal to the cutoff frequency of the HPF 112 and the second cutoff frequency is set to be a frequency lower than the first cutoff frequency.

Accordingly, in a case where the reference value shift amount calculated by the reference value shift amount calculation unit 123 is reflected as the correction term of the reference value, the cutoff frequency (first cutoff frequency) of the HPF 112A is changed and set to be the second cutoff frequency as the low frequency, and the HPF 112A can pass an effective angular velocity signal having a low frequency removed as the low frequency noise by the first cutoff frequency.

Since the angular velocity signal on which the reference value shift amount is reflected as the correction term of the reference value does not include a drift component, it is possible to set the second cutoff frequency for removing only the low frequency noise, as the cutoff frequency of the HPF 112A.

<Third Correction Process>

Figure 11A:
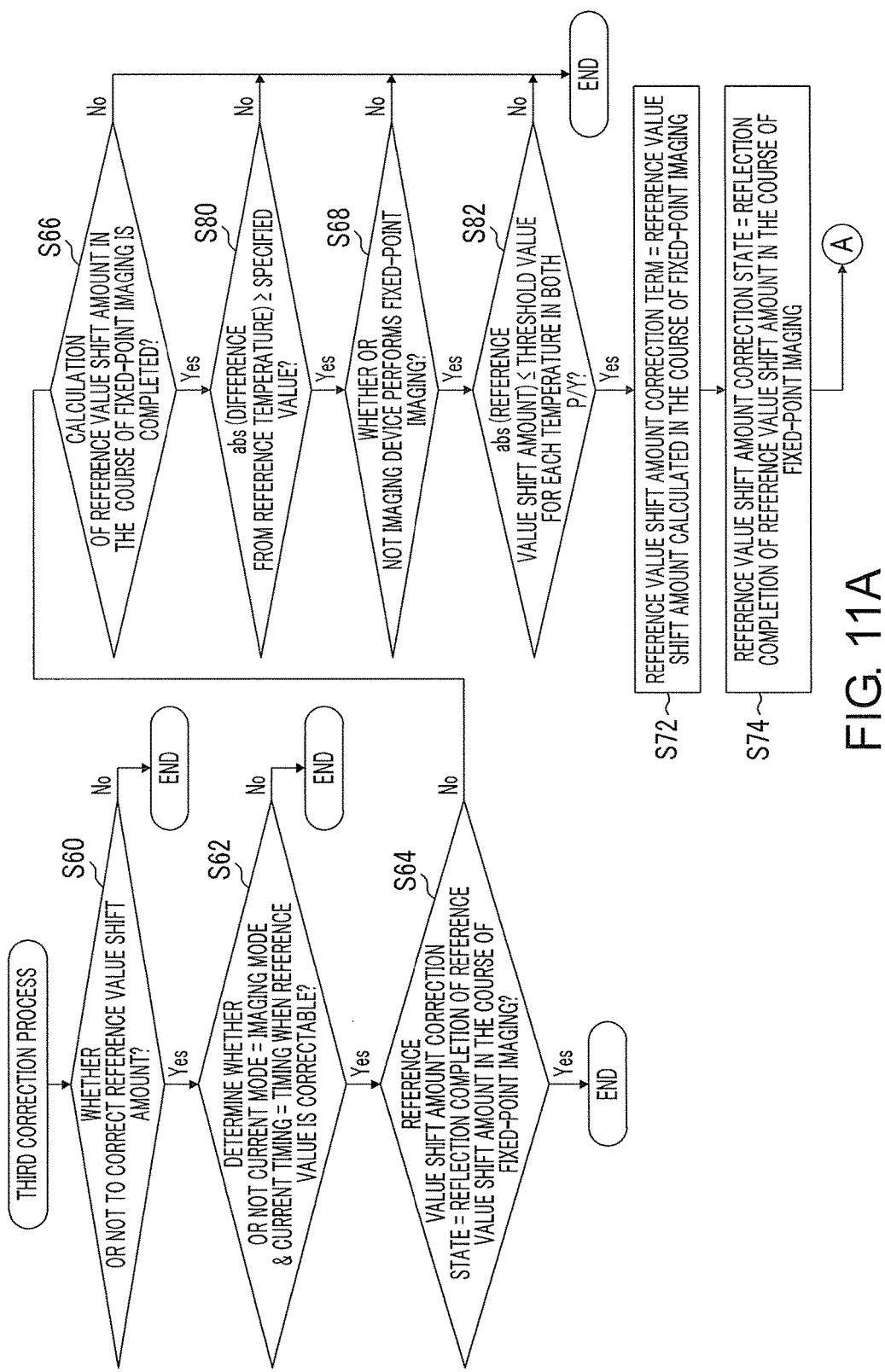
FIG. 11A and FIG. 11B collectively show a flowchart of a third correction process performed by the shake detection device 100B of the third embodiment shown in FIG. 10.
Figure 11B:
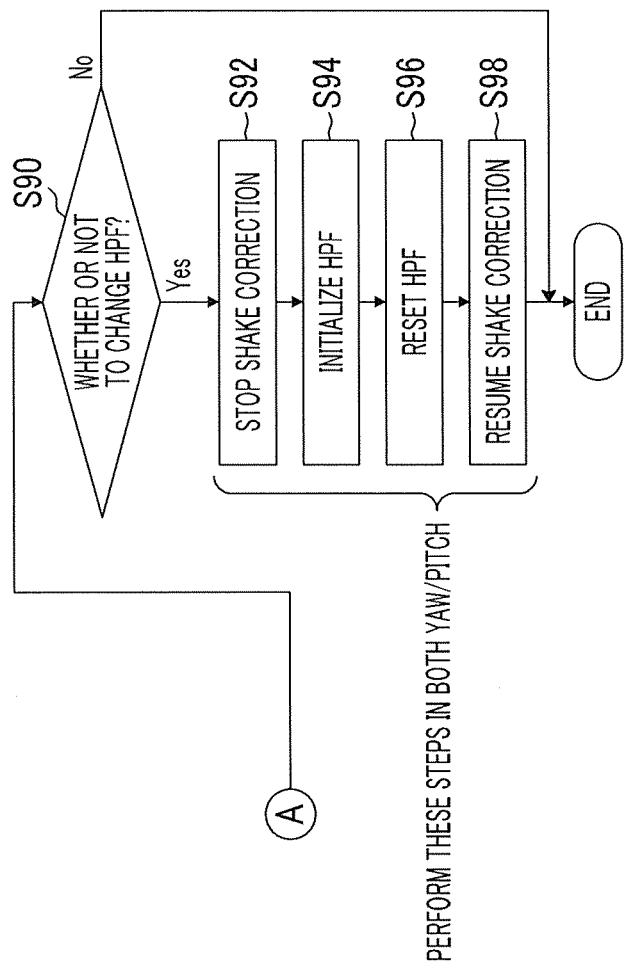

FIG. 11A and FIG. 11B collectively show a flowchart of a third correction process performed by the shake detection device 100B of the third embodiment shown in FIG. 10. Portions in common with those in the second correction process shown in FIG. 9 will be assigned the same step numbers, and the detailed description thereof will be omitted.

As shown in FIG. 11A and FIG. 11B collectively, the third correction process is different from the second correction process shown in FIG. 9 in that step S90 to step s98 are added after step S74.

In step S90, it is determined whether or not the command for changing the cutoff frequency of the HPF 112A (for changing from the first cutoff frequency to the second cutoff frequency) is received from the second determination unit 125B shown in FIG. 10.

In a case where the command for changing the cutoff frequency of the HPF 112A is received (in the case of "Yes"), the shake correction using the shake controller 50, the shake correction mechanism 42, and the correction lens 41 is stopped (step S92), and the initialization and resetting of the HPF 112A are performed (steps S94 and S96). For example, the HPF 112A can be constructed by a digital filter of a finite impulse response (FIR) type or an infinite impulse response (IIR) type. The HPF initializes a filter coefficient of the digital filter in step S94, and sets a filter coefficient with which the cutoff frequency is the second cutoff frequency, as the filter coefficient of the digital filter in step S96.

As mentioned above, after the cutoff frequency of the HPF 112A is changed, the shake correction using the shake controller 50 is resumed (step S98). It goes without saying that the processes of step S90 to step S98 are performed in the yaw and pitch directions.

<Fourth Embodiment of Shake Detection Device>

Next, a fourth embodiment of the shake detection device of the embodiment of the present invention will be described.

Figure 12:
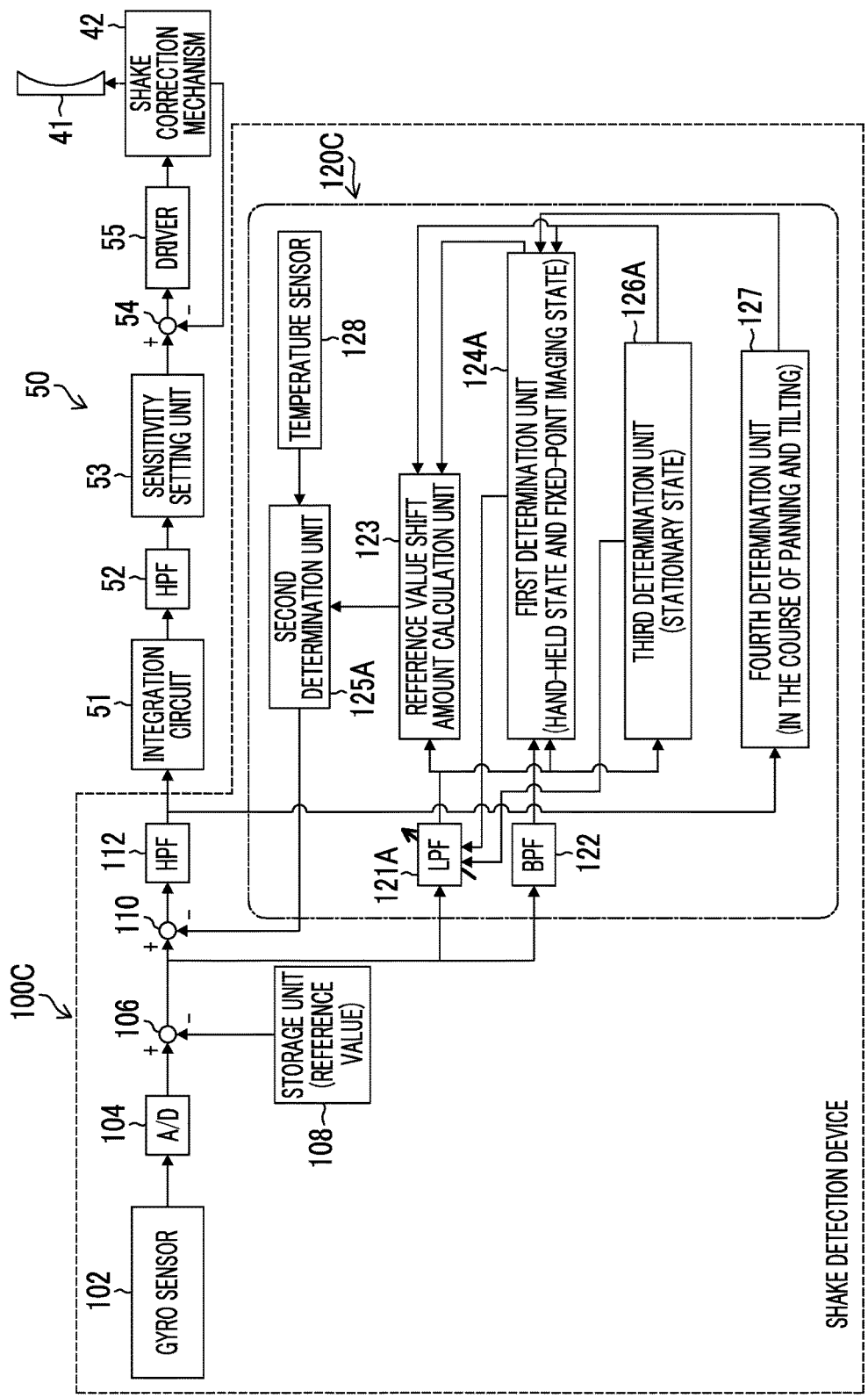
FIG. 12 is a block diagram showing an embodiment of a shake correction device including a shake detection device 100C of a fourth embodiment.

The shake correction device shown in FIG. 12 includes a shake detection device 100C of the fourth embodiment. In FIG. 12, portions in common with those in the shake detection device 100A of the second embodiment shown in FIG. 8 will be assigned the same references, and the detailed description thereof will be omitted.

In the shake detection device 100C of the fourth embodiment shown in FIG. 12, a reference value correction unit 120C is different from the reference value correction unit 120A of the second embodiment, and an LPF 121A, a first determination unit 124A, and a third determination unit 126A are particularly different from the LPF 121, the first determination unit 124, and the third determination unit 126 of the shake detection device 100A of the second embodiment.

The LPF 121A can change a cutoff frequency based on a determination result (information indicating that the imaging device is "in the course of fixed-point imaging" or "in the course of stationary") of the first determination unit 124A or the third determination unit 126A, and changes the cutoff frequency between at least a cutoff frequency (a first cutoff frequency) in the course of fixed-point imaging and a cutoff frequency (second cutoff frequency) in the course of stationary. It is preferable that the first cutoff frequency is equal to the cutoff frequency of the LPF 121 (FIG. 8) of the shake detection device 100A of the second embodiment and the second cutoff frequency is set to be a frequency lower than the first cutoff frequency.

The first determination unit 124A and the third determination unit 126A have the same functions of the first determination unit 124 and the third determination unit 126 of the shake detection device 100A of the second embodiment, and have a function of a second filter characteristic setting unit which sets the cutoff frequency of the LPF 121A. That is, in a case where it is determined that the imaging device 1 is in the fixed-point imaging state, the second determination unit 125B outputs the information indicating that the imaging device is "in the course of fixed-point imaging" to the LPF 121A. In a case where it is determined that the imaging device 1 is in the stationary state, the third determination unit 126A outputs the information indicating that the imaging device is "in the course of stationary" to the LPF 121A.

The LPF 121A changes the cutoff frequency based on the information indicating that the imaging device is "in the course of fixed-point imaging" or "in the course of stationary" input from the first determination unit 124A or the third determination unit 126A, and sets the cutoff frequency to be a lower frequency in the case of "in the course of stationary" than in the case of "in the course of fixed-point imaging".

In a case where the imaging device 1 is "in the course of stationary", the angular velocity signal having lower frequency is not output from the gyro sensor 102. Accordingly, it is possible to extract only the drift component from the LPF 121A by setting the cutoff frequency of the LPF 121A to be a lower frequency.

The determination result is applied to the reference value shift amount calculation unit 123 from the first determination unit 124A and the third determination unit 126A, and the reference value shift amount calculation unit 123 preferentially outputs the reference value shift amount calculated "in the course of stationary" to the second determination unit 125A in a case where the calculation of the reference value shift amount is completed "in the course of fixed-point imaging" and "in the course of stationary".

Accordingly, it is possible to reflect a higher-accurate reference value shift amount as the correction term of the reference value.

<Fourth Correction Process>

Figure 13A:
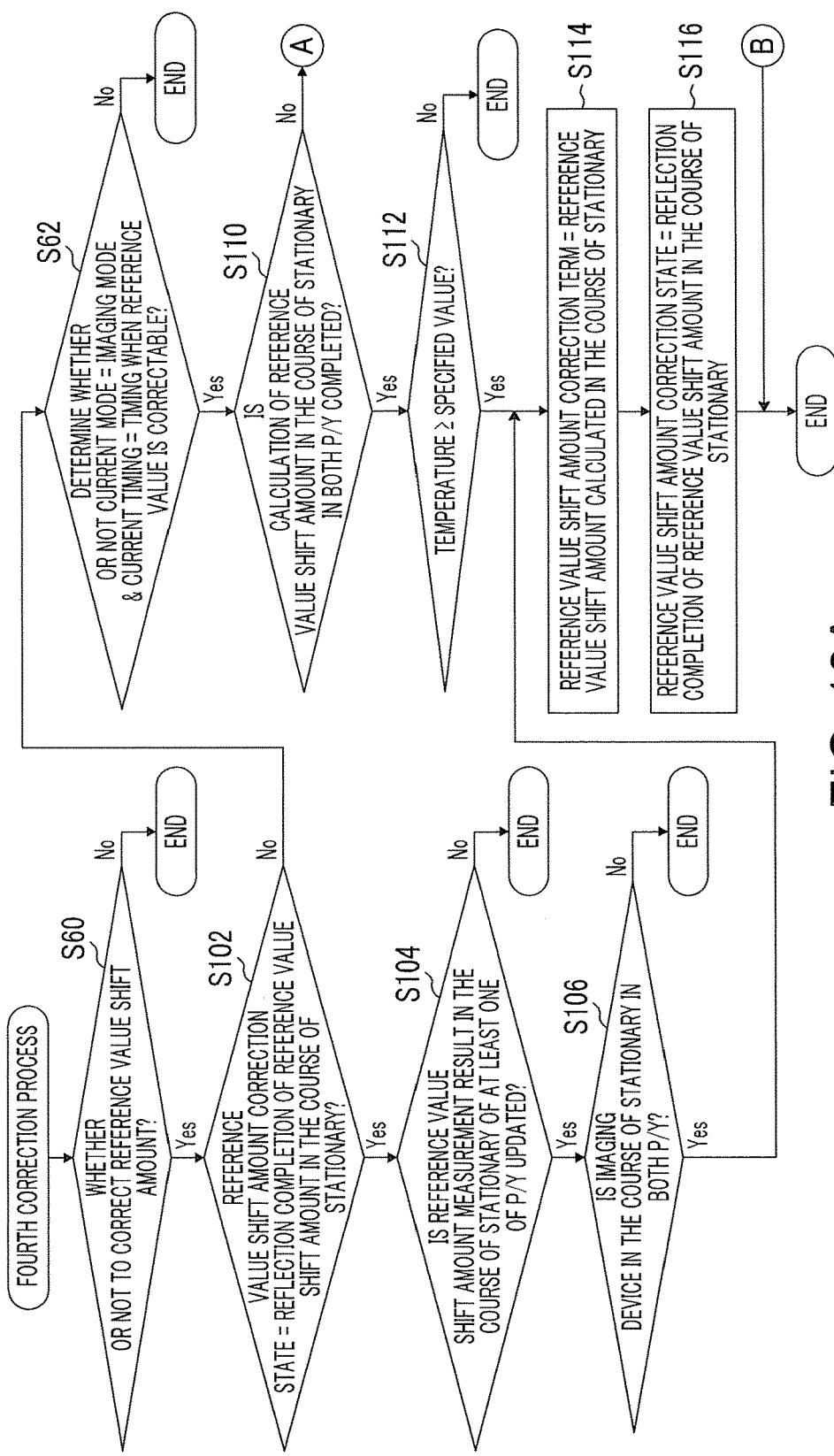
FIG. 13A and FIG. 13B collectively show a flowchart of a fourth correction process performed by the shake detection device 100C of the fourth embodiment shown in FIG. 12.
Figure 13B:
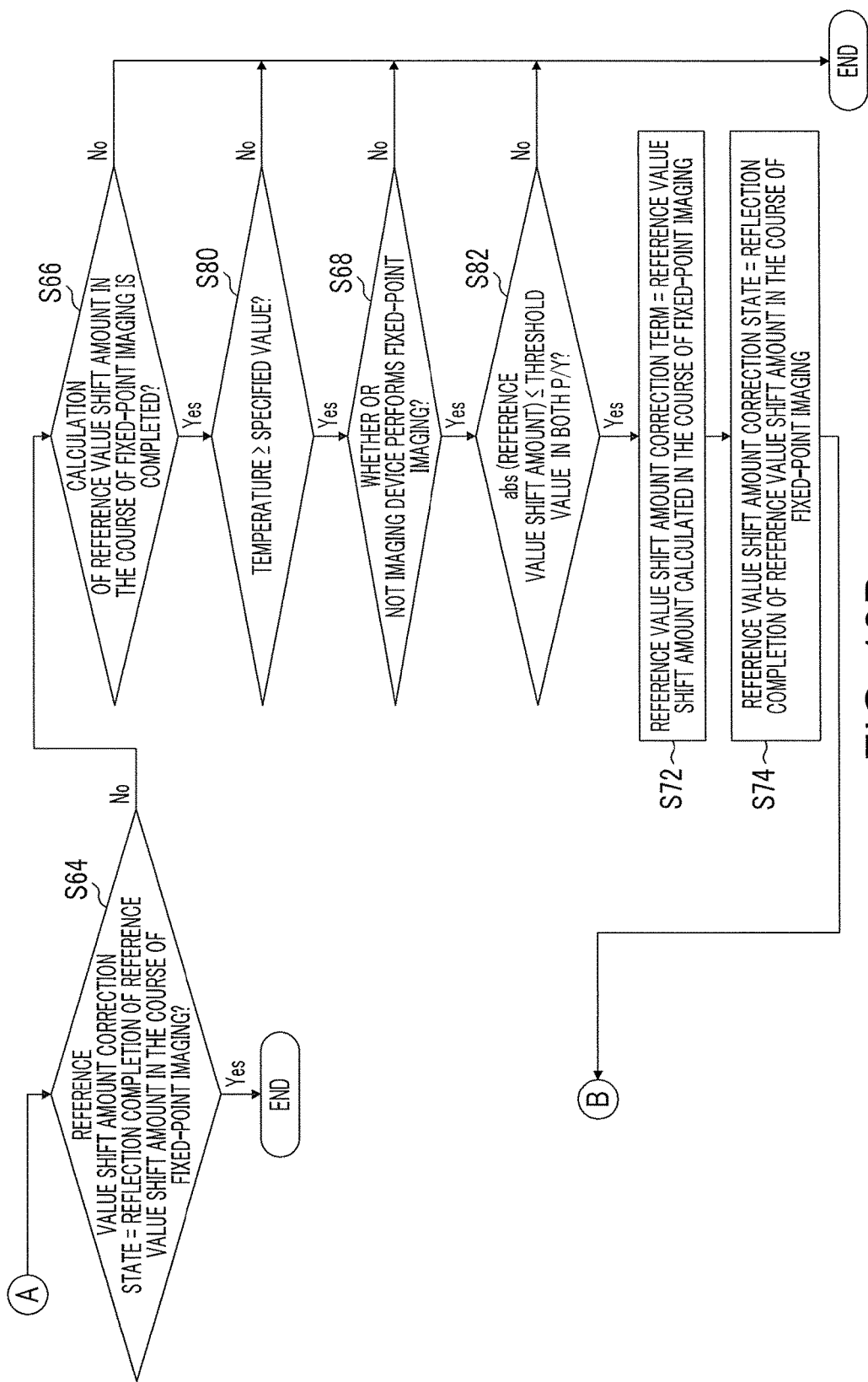

FIG. 13A and FIG. 13B collectively show a flowchart of a fourth correction process performed by the shake detection device 100C of the fourth embodiment shown in FIG. 12. Portions in common with those in the second correction process shown in FIG. 9 will be assigned the same step numbers, and the detailed description thereof will be omitted.

As shown in FIG. 13A and FIG. 13B collectively, the fourth correction process is different from the second correction process shown in FIG. 9 in that step S102 to step S106 are added between step S60 and step S62 and step S110 to step S116 are added between step S62 and step S64.

In step S102, the second determination unit determines whether or not the reference value shift amount correction state is "reflection completion of reference value shift amount in the course of stationary". As shown in steps S114 and S116 to be described below, in a case where the reference value shift amount calculated in the course of stationary by the reference value shift amount calculation unit 123 is used as the correction term of the reference value, the reference value shift amount correction state is "reflection completion of reference value shift amount in the course of stationary".

In a case where it is determined that the reference value shift amount correction state is not "reflection completion of reference value shift amount in the course of stationary" in step S102 (in the case of "No"), the process proceeds to step S110 via step S62. In this step, the second determination unit determines whether or not the calculation of the reference value shift amount performed in the course of stationary together with the pitch and the yaw is completed.

In a case where it is determined that the calculation of the reference value shift amount in the course of stationary is completed in step S110 (in the case of "Yes"), the process proceeds to step S112. In this step, the second determination unit determines whether or not the absolute value of the difference between the reference temperature at the time of measuring the reference value stored in the storage unit 108 and the current temperature detected by the temperature sensor 128 is equal to or greater than the specified value. In a case where the absolute value thereof is less than the specified value (in the case of "No"), the second determination unit determines that the reference value shift amount calculated in the course of stationary is not generated due to the temperature drift of the gyro sensor 102, and does not reflect the calculated reference value shift amount as the correction term of the reference value.

Meanwhile, in a case where the absolute value thereof is equal to or greater than the specified value (in the case of "Yes"), the second determination unit uses the reference value shift amount calculated in the course of stationary as the correction term of the reference value (reference value shift amount correction term) (step S114), and sets the reference value shift amount correction state to be "reflection completion of reference value shift amount in the course of stationary" (step S116).

Meanwhile, in a case where it is determined that the calculation of the reference value shift amount in the course of stationary is not completed in step S110 (in the case of "No"), the process proceeds to step S64, and performs a correction process of reflecting the reference value shift amount calculated in the course of fixed-point imaging, as the correction term of the reference value.

As stated above, in a case where the calculation of the reference value shift amount in the course of stationary is completed, the second determination unit reflects the reference value shift amount in the course of stationary in preference to the reference value shift amount calculated in the course of fixed-point imaging, as the correction term.

In a case where it is determined that the reference value shift amount correction state is "reflection completion of reference value shift amount in the course of stationary" in step S102 (in the case of "Yes"), the process proceeds to step S104. In this step, the second determination unit determines whether or not the reference value shift amount in the course of stationary of at least one of the pitch or the yaw is updated.

In a case where the at least one thereof is updated (in the case of "Yes"), the second determination unit determines whether or not the pitch and the yaw are in the course of stationary, and proceeds to step S114 in the course of stationary.

<Fifth Correction Process>

Figure 14A:
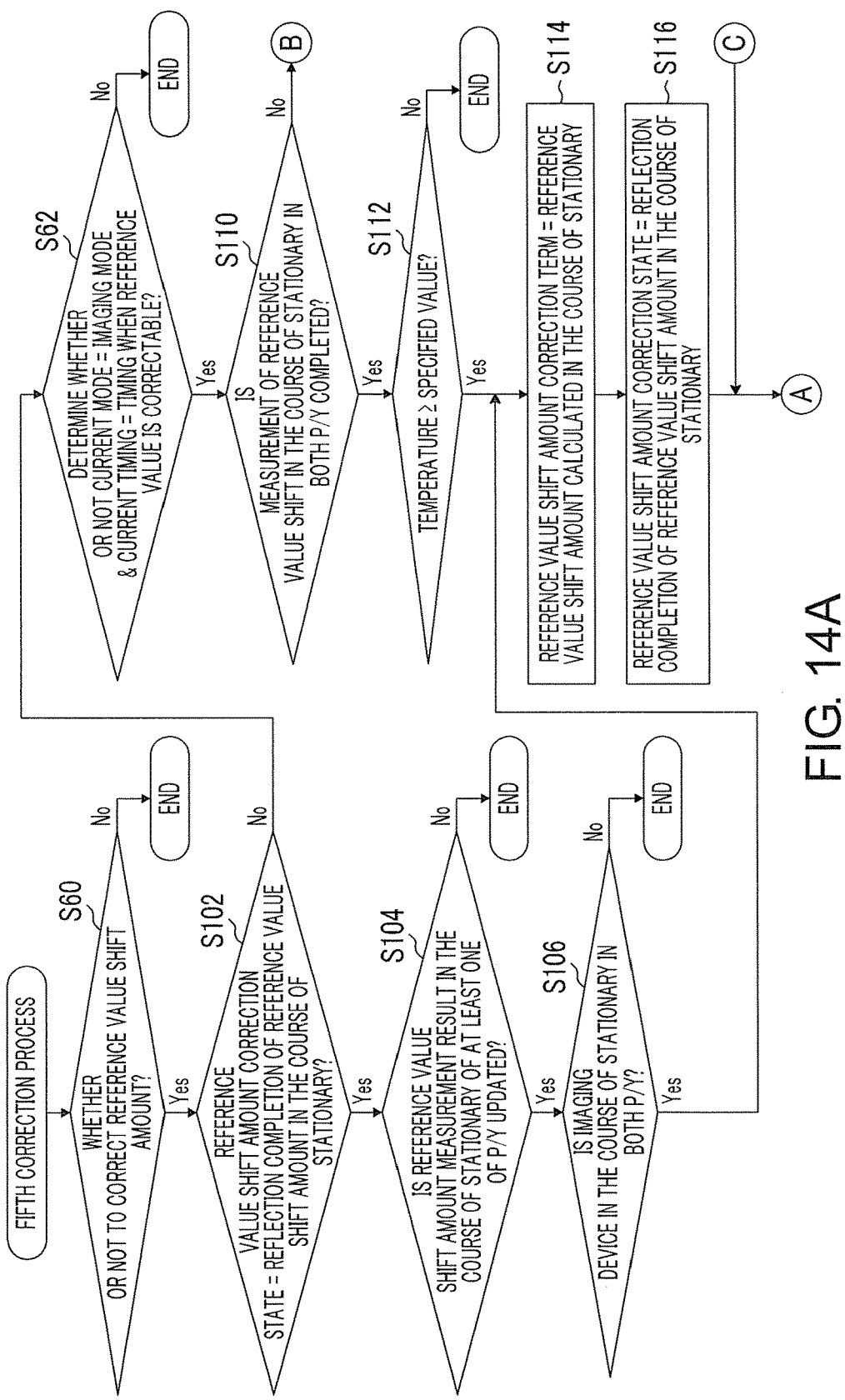
FIG. 14A, FIG. 14B and FIG. 14C collectively show a flowchart of a fifth correction process performed by a modification example of the shake detection device 100C of the fourth embodiment shown in FIG. 12.
Figure 14B:
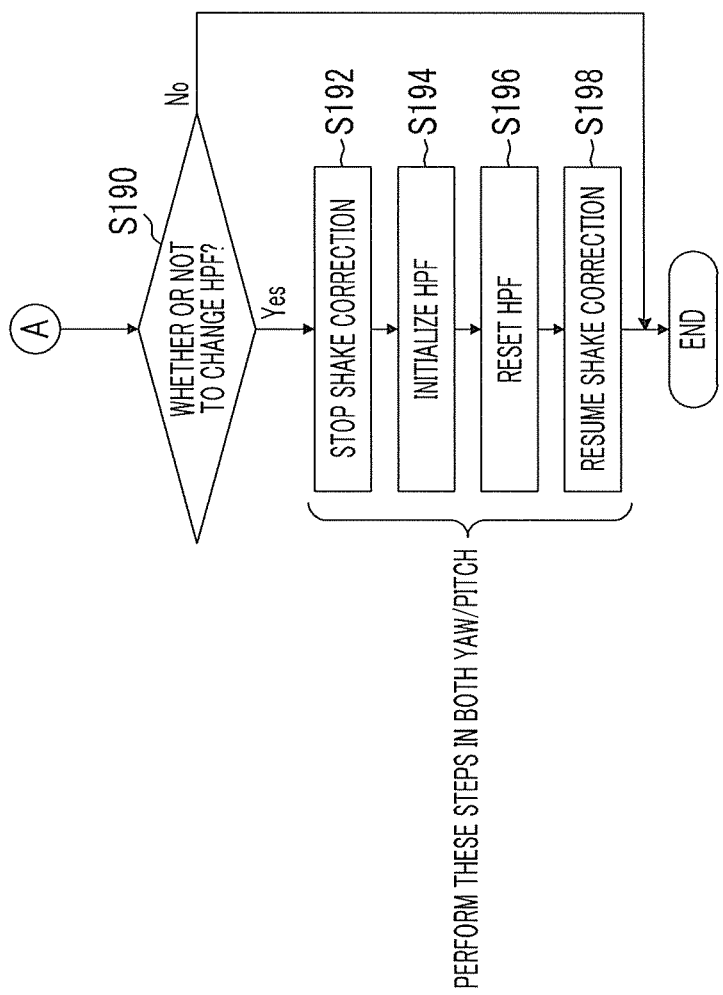
Figure 14C:
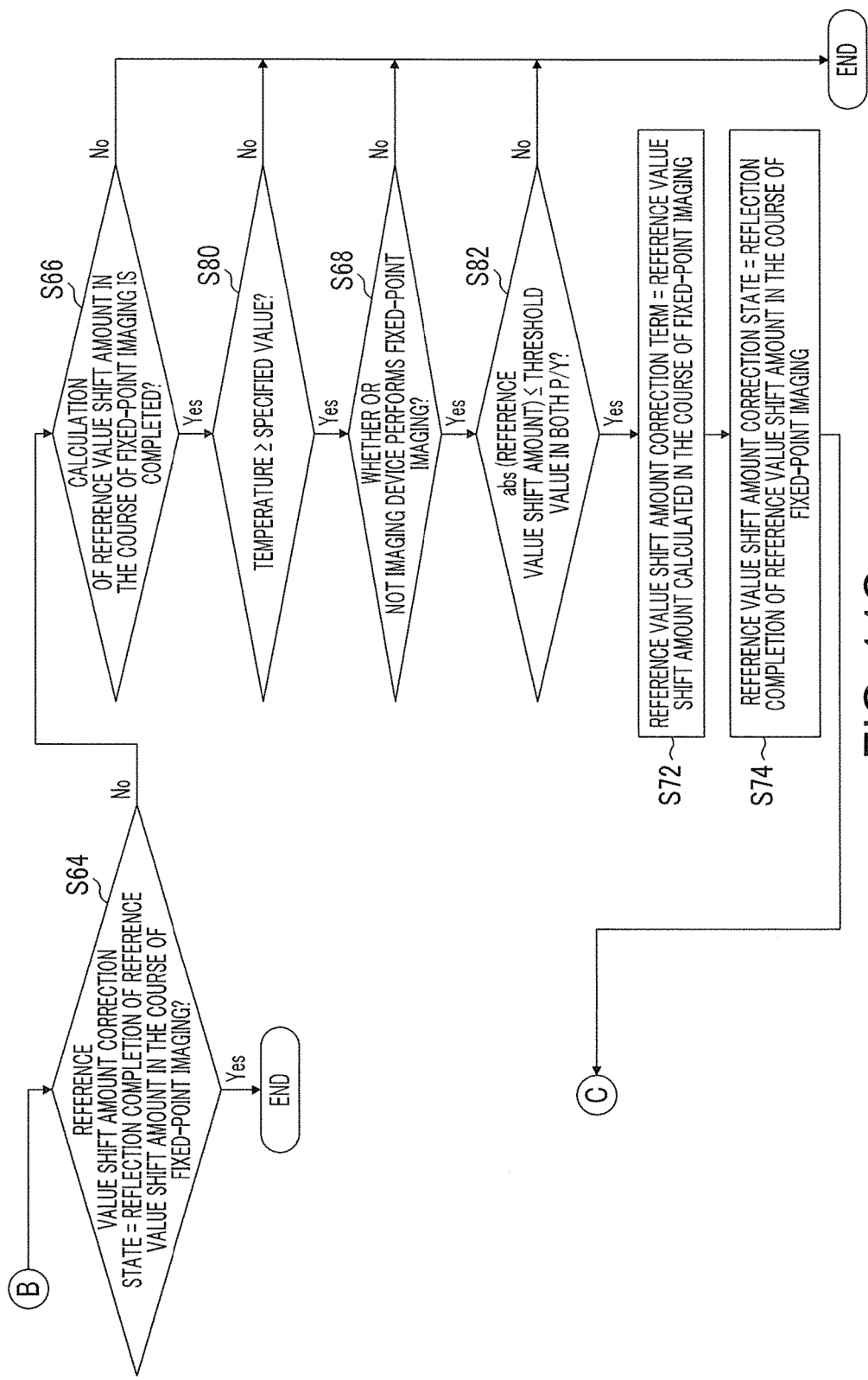

FIG. 14A, FIGS. 14B and 14C are collectively showing a flowchart of a fifth correction process performed by a shake detection device which is a modification example of the fourth embodiment shown in FIG. 12.

In a case where the reference value shift amount in the course of stationary is reflected as the correction term, the shake detection device which is the modification example of the fourth embodiment sets the cutoff frequency of the HPF 112 to be a frequency lower than a frequency in a case where the reference value shift amount in the course of fixed-point imaging is reflected as the correction term. The second determination unit 125A in this case functions as a third filter characteristic setting unit which sets and changes a filter characteristic (cutoff frequency) of the HPF 112. Portions in common with those in the fourth correction process shown in FIG. 13A and FIG. 13B collectively will be assigned the same step numbers, and the detailed description thereof will be omitted.

As shown in FIG. 14A, FIGS. 14B and 14C, the fifth correction process is different from the fourth correction process shown in FIG. 13A and FIG. 13B collectively in that step S190 to step S198 are added after step S116.

Similarly to step S90 to step S98 shown in FIG. 11B, in step S190 to step S198, the cutoff frequency (first cutoff frequency) of the HPF 112 is set and changed to be the second cutoff frequency as the low frequency. In a case where the reference value shift amount calculated in the course of stationary is reflected as the correction term, since the drift component is appropriately removed from the angular velocity signal, it is possible to restrict the low frequency noise to be removed by the HPF 112 to the low frequency.

In FIG. 14B, in step S190, it is determined whether or not the command for changing the cutoff frequency of the HPF 112 is received from the second determination unit 125A.

In a case where the command for changing the cutoff frequency of the HPF 112 is received (in the case of "Yes"), the shake correction using the shake controller 50, the shake correction mechanism 42, and the correction lens 41 is stopped (step S192), and the initialization and resetting of the HPF 112 are performed (steps S194 and S196).

After the cutoff frequency (first cutoff frequency) of the HPF 112 is changed to the second cutoff frequency as the low frequency in this manner, the shake correction using the shake controller 50 is resumed (step S198). It goes without saying that the processes of step S190 to step S198 are performed in the yaw and pitch directions.

The imaging device 1 according to the embodiment of the present invention is applicable to a mobile device having a function (a call handling function, a communication function, and a computing function) other than the imaging function in addition to the digital camera having an imaging function as a principal function. Examples of another aspect to which the present invention is applicable include a mobile phone, a smartphone, personal digital assistants (PDA), and a mobile game device which have a camera function. Hereinafter, an example of a smartphone to which the present invention is applicable will be described.

<Configuration of Smartphone>

Figure 15:
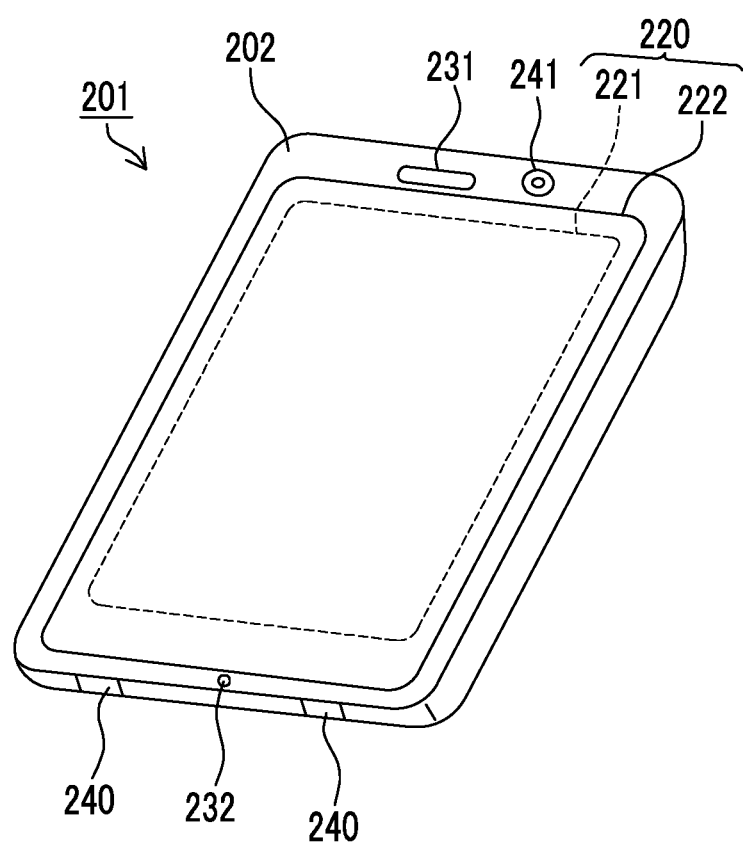
FIG. 15 shows an external appearance of a smartphone which is an embodiment of the imaging device according to an embodiment of the present invention.

FIG. 15 shows an external appearance of a smartphone 201 which is an embodiment of the imaging device according to the embodiment of the present invention. The smartphone 201 shown in FIG. 15 has a flat casing 202, and comprises a display input unit 220 in which a display panel 221 as a display unit and an operation panel 222 as an input unit are integrally formed on one surface of the casing 202. Such a casing 202 comprises a speaker 231, a microphone 232, an operation unit 240, and a camera unit 241. The configuration of the casing 202 is not limited thereto. For example, the display unit and the input unit may be independent of each other, or may have a folding structure or a slide mechanism.

Figure 16:
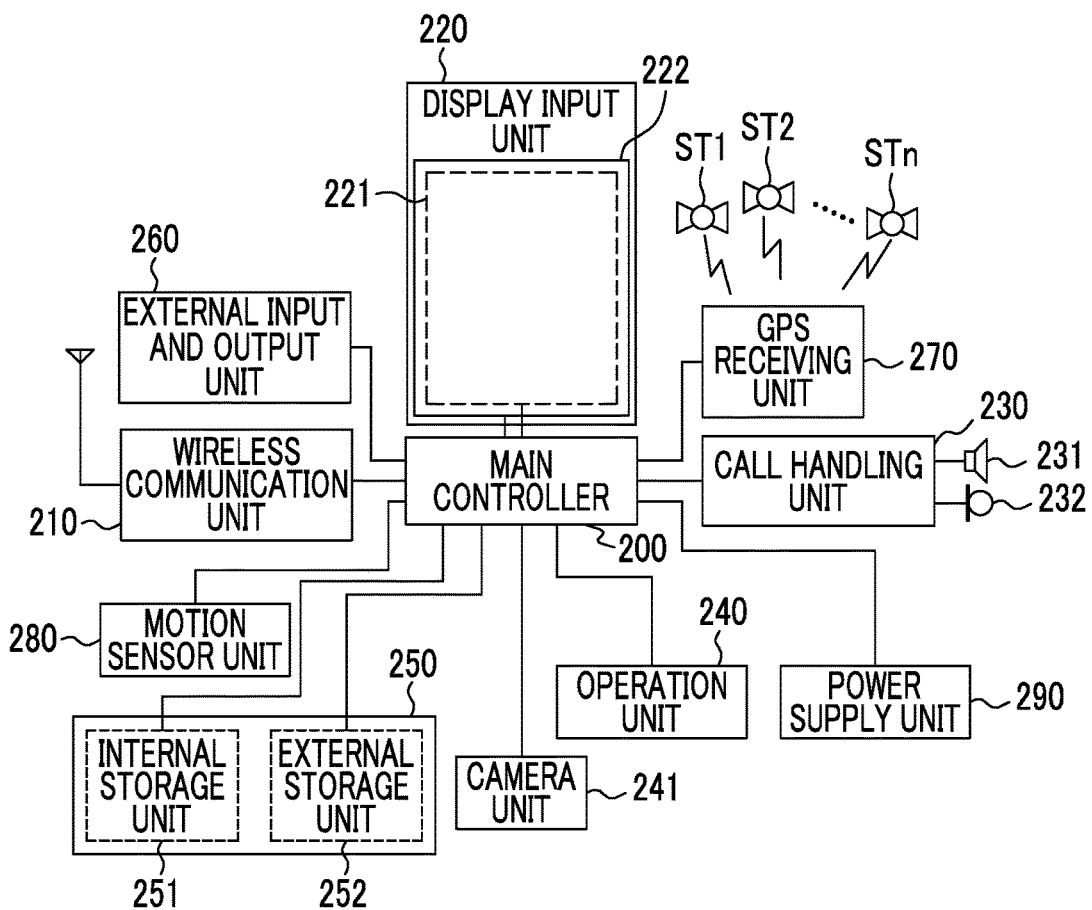
FIG. 16 is a block diagram showing a configuration of the smartphone.

FIG. 16 is a block diagram showing the configuration of the smartphone 201 shown in FIG. 15. As shown in FIG. 16, principal components of the smartphone comprise a wireless communication unit 210, the display input unit 220, a call handling unit 230, the operation unit 240, the camera unit 241, a storage unit 250, an external input and output unit 260, a Global Positioning System (GPS) receiving unit 270, a motion sensor unit 280, a power supply unit 290, and a main controller 200. Principal functions of the smartphone 201 comprise a wireless communication function of performing mobile wireless communication through a base station and a mobile communication network.

The wireless communication unit 210 performs wireless communication with the base station included in the mobile communication network according to a command of the main controller 200. With the use of the wireless communication, the transmission and reception of various kinds of file data, such as voice data and image data, and electronic mail data, or the reception of Web data and streaming data are performed.

The display input unit 220 is a so-called touch panel which displays images (still images and moving images) or character information to visually transfer information to the user and detects a user's operation on the displayed information under the control of the main controller 200, and comprises the display panel 221 and the operation panel 222.

The display panel 221 uses a liquid crystal display (LCD) or an organic electro-luminescence display (OELD) as a display device. The operation panel 222 is a device which is placed such that an image displayed on a display surface of the display panel 221 is visible, and detects one or a plurality of coordinates of an operation with a user's finger or a stylus. In a case where the device is operated with the user's finger or the stylus, a detection signal due to the operation is output to the main controller 200. Next, the main controller 200 detects an operation position (coordinates) on the display panel 221 based on the received detection signal.

As shown in FIG. 15, although the display panel 221 and the operation panel 222 of the smartphone 201 illustrated as the embodiment according to the imaging device of the embodiment of the present invention are integrated to constitute the display input unit 220, the operation panel 222 is arranged to completely cover the display panel 221. In a case where this arrangement is employed, the operation panel 222 may have a function of detecting a user's operation even in a region outside the display panel 221. In other words, the operation panel 222 may comprise a detection region (hereinafter, referred to as a display region) for an overlapped portion which overlaps the display panel 221 and a detection region (hereinafter, referred to as a non-display region) for an outer edge portion which does not overlap the display panel 221 other than the display region.

Although the size of the display region may completely match the size of the display panel 221, it is not necessary to match both of the size of the display region and the size of the display panel. The operation panel 222 may comprise two sensitive regions including an outer edge portion and an inner portion other than the outer edge portion. The width of the outer edge portion is appropriately designed according to the size of the casing 202. As a position detection system which is employed in the operation panel 222, a matrix switching system, a resistive film system, a surface acoustic wave system, an infrared system, an electromagnetic induction system, and an electrostatic capacitance system are exemplified, and any system can be employed.

The call handling unit 230 comprises the speaker 231 and the microphone 232, converts voice of the user input through the microphone 232 into voice data processable in the main controller 200 and outputs voice data to the main controller 200, or decodes voice data received by the wireless communication unit 210 or the external input and output unit 260 and outputs voice from the speaker 231. As shown in FIG. 15, for example, the speaker 231 and the microphone 232 can be mounted on the same surface as the surface on which the display input unit 220 is provided.

The operation unit 240 is a hardware key using a key switch, and receives a command from the user. For example, as shown in FIG. 15, the operation unit 240 is a push button-type switch which is mounted on the side surface of the casing 202 of the smartphone 201, and is turned on by being depressed with a finger and is turned off by restoration force of the panel in a case where the finger is released.

The storage unit 250 stores a control program or control data of the main controller 200, application software, address data in association with the name, and telephone number of a communication partner, data of transmitted and received electronic mail, Web data downloaded by Web browsing, and downloaded content data, and temporarily stores streaming data. The storage unit 250 is constituted by an internal storage unit 251 built in the smartphone and an external storage unit 252 having a slot for an attachable and detachable external memory. The internal storage unit 251 and the external storage unit 252 constituting the storage unit 250 are realized using a memory (for example, a micro SD (Registered Trademark) memory), such as a flash memory type, a hard disk type, a multimedia card micro type, or a card type, or a recording medium, such as a random access memory (RAM) or a read only memory (ROM).

The external input and output unit 260 plays a role of an interface with all external devices connected to the smartphone 201, and is provided for direct or indirect connection to other external devices through communication (for example, universal serial bus (USB), or IEEE 1394), or a network (for example, the Internet, wireless local area network (LAN), Bluetooth (Registered trademark), radio frequency identification (RFID), infrared communication (Infrared Data Association: IrDA) (Registered Trademark), Ultra Wideband (UWB) (Registered Trademark), or ZigBee (Registered Trademark)).

The external devices connected to the smartphone 201 are, for example, a wired or wireless headset, a wired or wireless external charger, a wired or wireless data port, a memory card connected through a card socket, a subscriber identity module (SIM) card, a user identity module (UIM) card, an external audio-video device connected through an audio-video input and output (I/O) terminal, an external audio-video device connected in a wireless manner, a smartphone connected in a wired or wireless manner, a personal computer connected in a wired or wireless manner, a PDA connected in a wired or wireless manner, and an earphone. The external input and output unit can transfer data transmitted from the external devices to the respective components in the smartphone 201 or can transmit data in the smartphone 201 to the external devices.

The GPS receiving unit 270 receives GPS signals transmitted from GPS satellites ST1 to STn according to a command of the main controller 200, executes positioning calculation processing based on a plurality of received GPS signals, and detects the position of the smartphone 201 having latitude, longitude, and altitude. In a case where positional information can be acquired from the wireless communication unit 210 or the external input and output unit 260 (for example, a wireless LAN), the GPS receiving unit 270 can detect the position using the positional information.

The motion sensor unit 280 comprises, for example, a three-axis acceleration sensor or a gyro sensor, and detects physical motion of the smartphone 201 according to a command of the main controller 200. The moving direction or acceleration of the smartphone 201 is detected by detecting physical motion of the smartphone 201. The detection result is output to the main controller 200.

The power supply unit 290 supplies electric power stored in a battery (not shown) to the respective units of the smartphone 201 according to a command of the main controller 200.

The main controller 200 comprises a microprocessor, operates according to the control program or control data stored in the storage unit 250, and integrally controls the respective units of the smartphone 201. The main controller 200 has a mobile communication control function of controlling respective units of a communication system in order to perform voice communication or data communication through the wireless communication unit 210, and an application processing function.

The application processing function is realized by the main controller 200 operating according to application software stored in the storage unit 250. The application processing function is, for example, an infrared communication function of controlling the external input and output unit 260 to perform data communication with a device facing the smartphone 201, an electronic mail function of transmitting and receiving electronic mail and a Web browsing function of browsing Web pages.

The main controller 200 has an image processing function of displaying video on the display input unit 220 based on image data (still image or moving image data), such as received data or downloaded streaming data. The image processing function refers to a function of the main controller 200 decoding image data, performing image processing on the decoding result, and displaying an image on the display input unit 220.

The main controller 200 executes display control on the display panel 221 and operation detection control for detecting a user's operation through the operation unit 240 and the operation panel 222.

With the execution of the display control, the main controller 200 displays an icon for activating application software or a software key, such as a scroll bar, or displays a window for creating electronic mail. The scroll bar refers to a software key for receiving a command to move a display portion of an image which is too large to fit into the display region of the display panel 221.

With the execution of the operation detection control, the main controller 200 detects a user's operation through the operation unit 240, receives an operation on the icon or an input of a character string in an entry column of the window through the operation panel 222, or receives a scroll request of a display image through the scroll bar.

In addition, with the execution of the operation detection control, the main controller 200 has a touch panel control function of determining whether an operation position on the operation panel 222 is the superimposed portion (display region) overlapping the display panel 221 or the outer edge portion (non-display region) not overlapping the display panel 221 other than the display region, and controlling the sensitive region of the operation panel 222 or the display position of the software key.

The main controller 200 may detect a gesture operation on the operation panel 222 and may execute a function set in advance according to the detected gesture operation. The gesture operation is not a conventional simple touch operation, but means an operation to render a track with a finger, an operation to simultaneously designate a plurality of positions, or an operation to render a track for at least one of a plurality of positions by combining the above-described operations.

The camera unit 241 is a digital camera that performs electronic imaging by using an imaging element such as a complementary metal oxide semiconductor (CMOS) or a charge-coupled device (CCD), and corresponds to the imaging device 1 shown in FIG. 1. For example, under the control of the main controller 200, the camera unit 241 can convert image data obtained through the imaging into compressed image data such as the Joint Photographic coding Experts Group (JPEG), can record the converted image data in the storage unit 250, and can output the image data through the external input and output unit 260 or the wireless communication unit 210. In the smartphone 201 shown in FIG. 15, although the camera unit 241 is mounted on the same surface as the display input unit 220, the mounting position of the camera unit 241 is not limited thereto. The camera unit 241 may be mounted on the rear surface of the display input unit 220, or a plurality of camera units 241 may be mounted. In a case where the plurality of camera units 241 is mounted, it is possible to perform imaging by using the single camera unit while switching between the camera units 241 used for imaging, or it is possible to perform imaging by simultaneously using the plurality of camera units 241.

The camera unit 241 can be used for various functions of the smartphone 201. For example, an image acquired by the camera unit 241 can be displayed on the display panel 221, or an image in the camera unit 241 can be used as one operation input of the operation panel 222. At the time of the detection of the position using the GPS receiving unit 270, the position may be detected with reference to an image from the camera unit 241. In addition, the optical axis direction of the camera unit 241 of the smartphone 201 can be determined or a current use environment may be determined with reference to an image from the camera unit 241 without using the three-axis acceleration sensor (gyro sensor) or in combination with the three-axis acceleration sensor. Of course, an image from the camera unit 241 may be used in application software.

In addition, image data of a still image or a moving image may be attached with positional information acquired by the GPS receiving unit 270, voice information (which may be converted to text information through voice-text conversion by the main controller) acquired by the microphone 232, or posture information acquired by the motion sensor unit 280 and can be recorded in the storage unit 250, or may be output through the external input and output unit 260 or the wireless communication unit 210.

It goes without saying that the present invention is not limited to the above-described embodiments, and may be modified without departing from the spirit of the present invention.

EXPLANATION OF REFERENCES

1: imaging device
10: imaging lens
10a: zoom lens
10b: focus lens
11: imaging element
12: stop
14: infrared cut filter
15: CPU
18: lens drive unit
19: stop drive unit
20: imaging element drive unit
21: operation unit
22: analog signal processing unit
23: A/D converter
24: main memory
25: memory controller
26: digital signal processing unit
27: compression/decompression processing unit
28: accumulation unit
29: memory card
30: external memory controller
31: display unit
32: display controller
33: control bus
34: data bus
41: correction lens
42: shake correction mechanism
50: shake controller
51: integration circuit
52: HPF
53: sensitivity setting unit
54: subtraction unit
55: driver
100, 100A, 100B, 100C: shake detection device
102: gyro sensor
104: A/D converter
106: subtraction unit
108: storage unit
110: subtraction unit
112, 112A: HPF
120: reference value correction unit
120A: reference value correction unit
120B: reference value correction unit
120C: reference value correction unit
121, 121A: LPF
122: BPF
123: reference value shift amount calculation unit
124, 124A: first determination unit
125, 125A, 125B: second determination unit
126, 126A: third determination unit
127: fourth determination unit
128: temperature sensor
150: flow line
200: main controller
201: smartphone
202: casing
210: wireless communication unit
220: display input unit
221: display panel
222: operation panel
230: call handling unit
231: speaker
232: microphone
240: operation unit
241: camera unit
250: storage unit
251: internal storage unit
252: external storage unit
260: external input and output unit
270: GPS receiving unit
280: motion sensor unit
290: power supply unit
S10 to S98, S102 to S116, S190 to S198: step

What is claimed is:

1. A shake detection device of an imaging device comprising:
   a shake detection sensor that detects shake occurring in the imaging device;
   a storage unit that stores a reference value corresponding to an output of the shake detection sensor in a case where the imaging device is in a stationary state;
   a subtraction unit that subtracts the reference value from the output of the shake detection sensor;
   a first filter that extracts a low frequency component from an output after the subtraction of the reference value using the subtraction unit;
   a second filter that extracts a high frequency component from the output after the subtraction of the reference value using the subtraction unit;
   a first determination unit that determines whether or not the imaging device is in a hand-held state and a fixed-point imaging state based on an output of the first filter and an output of the second filter;
   a reference value shift amount calculation unit that calculates a reference value shift amount for the reference value based on the output of the first filter for a period during which the determination is performed in a case where the first determination unit determines that the imaging device is in the hand-held state and the fixed-point imaging state;
   a correction unit that corrects the output after the subtraction of the reference value using the subtraction unit by using the reference value shift amount; and
   a third filter that removes a low frequency noise from an output after the correction of the reference value shift amount.

2. The shake detection device of an imaging device according to claim 1, wherein, in a case where the output of the first filter is within a first output width for a specified time, the number of times a sign of the output of the second filter is changed for the specified time is equal to or greater than a threshold value, and the output of the second filter is within a second output width for the specified time, the first determination unit determines that the imaging device is in the hand-held state and the fixed-point imaging state.

3. The shake detection device of an imaging device according to claim 1,
wherein the correction unit subtracts the reference value shift amount from the output after the subtraction of the reference value using the subtraction unit.

4. The shake detection device of an imaging device according to claim 1, further comprising:
a second determination unit that determines whether or not the reference value shift amount calculated by the reference value shift amount calculation unit is within a predetermined range,
wherein, in a case where the second determination unit determines that the reference value shift amount is within the predetermined range, the correction unit corrects the output after the subtraction of the reference value using the subtraction unit by using the reference value shift amount.

5. The shake detection device of an imaging device according to claim 4, further comprising:
a temperature sensor that detects a temperature of the shake detection sensor; and
a setting unit that sets the predetermined range according to the temperature detected by the temperature sensor.

6. The shake detection device of an imaging device according to claim 1, further comprising:
a first filter characteristic setting unit that sets a cutoff frequency of the third filter for removing the low frequency noise to be a frequency lower than a frequency before the correction of the output in a case where the output after the subtraction of the reference value is corrected by using the reference value shift amount calculated in a case where it is determined that the imaging device is in the hand-held state and the fixed-point imaging state.

7. The shake detection device of an imaging device according to claim 1, further comprising:
a third determination unit that determines whether or not the imaging device is in the stationary state,
wherein, in a case where the third determination unit determines that the imaging device is in the stationary state, the reference value shift amount calculation unit calculates the reference value shift amount for the reference value based on the output of the first filter for a period during which it is determined that the imaging device is in the stationary state in preference to the determination result using the first determination unit.

8. The shake detection device of an imaging device according to claim 7,
wherein the third determination unit determines whether or not the imaging device is in the stationary state based on the output of the second filter, an output of the third filter, or an output of a tripod detection sensor which detects that the imaging device is attached to a tripod.

9. The shake detection device of an imaging device according to claim 7, further comprising:
a second filter characteristic setting unit that sets a cutoff frequency of the first filter to be a frequency lower than a frequency in a case where the first determination unit determines that the imaging device is in the hand-held state and the fixed-point imaging state, in a case where the third determination unit determines that the imaging device is in the stationary state at the time of the calculation of the reference value shift amount for the reference value using the reference value shift amount calculation unit based on the output of the first filter.

10. The shake detection device of an imaging device according to claim 7, further comprising:
a first filter characteristic setting unit that sets a cutoff frequency of the third filter for removing the low frequency noise to be a frequency lower than a frequency before the correction of the output, in a case where the output after the subtraction of the reference value is corrected by using the reference value shift amount calculated in a case where it is determined that the imaging device is in the hand-held state and the fixed-point imaging state; and
a third filter characteristic setting unit that sets the cutoff frequency of the third filter for removing the low frequency noise to be a frequency lower than the cutoff frequency set by the first filter characteristic setting unit, in a case where the output after the subtraction of the reference value is corrected by using the reference value shift amount calculated in a case where it is determined that the imaging device is in the stationary state.

11. The shake detection device of an imaging device according to claim 1, further comprising:
a fourth determination unit that determines whether or not the imaging device pans and tilts,
wherein, in a case where the fourth determination unit determines that the imaging device does not pan and tilt, the first determination unit determines whether or not the imaging device is in the hand-held state and the fixed-point imaging state.

12. The shake detection device of an imaging device according to claim 11,
wherein the fourth determination unit determines whether or not the imaging device pans and tilts based on an output of the third filter.

13. A shake correction device of an imaging device comprising:
the shake detection device of an imaging device according to claim 1;
a shake angle calculation unit that integrates an output of the third filter and calculates a shake angle of the imaging device;
a shake correction mechanism that drives a shake correction optical system or an imaging element of the imaging device; and
a shake controller that controls the shake correction mechanism based on the shake angle calculated by the shake angle calculation unit.

14. An imaging device comprising:
an imaging unit that includes an imaging optical system and an imaging element; and
the shake correction device of an imaging device according to claim 13.

15. A shake detection method of an imaging device, comprising:
a step of obtaining an output of a shake detection sensor that detects shake occurring in the imaging device;
a step of subtracting a reference value corresponding to the output of the shake detection sensor in a case where the imaging device is in a stationary state from the obtained output of the shake detection sensor;

a step of extracting a low frequency component from an output after the subtraction of the reference value;

a step of extracting a high frequency component from the output after the subtraction of the reference value;

a step of determining whether or not the imaging device is in a hand-held state and a fixed-point imaging state based on the extracted low frequency component and high frequency component;

a step of calculating the reference value shift amount for the reference value based on the low frequency component for a period during the determination is performed in a case where it is determined that the imaging device is in the hand-held state and the fixed-point imaging state;

a step of correcting the output after the subtraction of the reference value by using the reference value shift amount; and a step of removing a low frequency noise from an output after the correction of the reference value shift amount.

* * * * *